US012735140B2

(12) United States Patent
Newby et al.

(10) Patent No.: US 12,735,140 B2
(45) Date of Patent: Sep. 15, 2026

(54) ARTICULATING, SELF-CENTERING TRUCK FOR PERSONAL MOBILITY VEHICLES

(71) Applicant: Trio Motors, Inc., Palo Alto, CA (US)

(72) Inventors: Paul M. Newby, Palo Alto, CA (US); Stephen K. Kershner, Menlo Park, CA (US); Michael Siu Wei Yim, Santa Clara, CA (US); Chris Tacklind, Menlo Park, CA (US)

(73) Assignee: Trio Motors, Inc., Menlo Park, CA (US)

(*) Notice: Subject to any disclaimer, the term of this patent is extended or adjusted under 35 U.S.C. 154(b) by 0 days.

(21) Appl. No.: 18/388,464

(22) Filed: Nov. 9, 2023

(65) Prior Publication Data

US 2024/0182130 A1 Jun. 6, 2024

Related U.S. Application Data

(63) Continuation of application No. 17/734,972, filed on May 2, 2022, now Pat. No. 11,851,126, which is a continuation of application No. 17/339,906, filed on Jun. 4, 2021, now Pat. No. 11,345,429, which is a continuation-in-part of application No. 17/236,973, filed on Apr. 21, 2021, now abandoned, which is a continuation of application No. 16/535,004, filed on Aug. 7, 2019, now Pat. No. 11,008,061.

(60) Provisional application No. 63/034,764, filed on Jun. 4, 2020, provisional application No. 62/715,738, filed on Aug. 7, 2018.

(51) Int. Cl.
*B62K 15/00* (2006.01)
*B62K 5/027* (2013.01)

(52) U.S. Cl.
CPC ............ *B62K 15/008* (2013.01); *B62K 5/027* (2013.01); *B62K 2202/00* (2013.01)

(58) Field of Classification Search
CPC .. B62K 15/008; B62K 5/027; B62K 2202/00; B62K 5/10; B62K 23/08; B62K 3/002; B62J 15/00; B62L 1/04; B62L 3/00
See application file for complete search history.

(56) References Cited

U.S. PATENT DOCUMENTS

| | | | | |
|---|---|---|---|---|
| 4,861,054 A * | 8/1989 | Spital | A63C 17/015 | 280/11.115 |
| 5,040,812 A * | 8/1991 | Patin | B62D 9/02 | 280/62 |
| 9,073,594 B2 * | 7/2015 | Sluijter | B62K 15/006 | |

(Continued)

*Primary Examiner* — Drew J Brown
(74) *Attorney, Agent, or Firm* — Run8 Patent Group, LLC; Peter Miller

(57) ABSTRACT

One variation of a system includes: a cam block mounted to a deck of a scooter and defining cam lobes arranged about a pivot feature and cam heels between the set of cam lobes; a pivot block pivotably coupled to the pivot feature and defining followers riding over the cam lobes; a pair of wheel uprights locating a pair of wheel assemblies; a first lateral link extending between and coupled to the pair of wheel uprights and pivotably coupled to the pivot block; a second lateral link extending between and coupled to the pair of wheel uprights, vertically offset from the first lateral link, and coupled to the pivot block between pair of wheel uprights; and a spring element driving the followers of the pivot block into cam heels to bias the second lateral link toward a neutral position.

20 Claims, 14 Drawing Sheets

(56) References Cited

U.S. PATENT DOCUMENTS

| | | | | |
|---|---|---|---|---|
| 2002/0121155 | A1* | 9/2002 | Wu | B62K 3/002 74/551.3 |
| 2003/0001351 | A1* | 1/2003 | Schauble | B62K 3/002 280/87.041 |
| 2007/0265746 | A1* | 11/2007 | Fulks | B60T 8/1755 701/1 |
| 2012/0018968 | A1* | 1/2012 | Joslin | B62K 3/002 280/87.041 |
| 2013/0062377 | A1* | 3/2013 | Turner | B62K 7/04 224/276 |
| 2013/0257003 | A1* | 10/2013 | Chen | B62K 21/12 280/87.041 |
| 2015/0035257 | A1* | 2/2015 | Zaid | B62D 31/006 280/641 |
| 2015/0042053 | A1* | 2/2015 | Berndorfer | B62K 13/00 280/7.1 |
| 2017/0066496 | A1* | 3/2017 | Ochner | B62M 7/12 |
| 2017/0247075 | A1* | 8/2017 | Kano | B62K 3/002 |
| 2018/0170473 | A1* | 6/2018 | Koo | B62J 50/10 |
| 2020/0047840 | A1* | 2/2020 | Newby | B62K 21/12 |

* cited by examiner

ARTICULATING, SELF-CENTERING TRUCK FOR PERSONAL MOBILITY VEHICLES

CROSS-REFERENCE TO RELATED APPLICATIONS

This Application is a continuation of U.S. patent application Ser. No. 17/734,972, filed on 2 May 2022, which is a continuation of U.S. patent application Ser. No. 17/339,906, filed on 4 Jun. 2022, which claims priority to U.S. Provisional Patent Application No. 63/034,764, filed on 4 Jun. 2020, and which is a continuation-in-part application of U.S. patent application Ser. No. 17/236,973, filed on 21 Apr. 2021, which is a continuation application of U.S. patent application Ser. No. 16/535,004, filed on 7 Aug. 2019, which claims the benefit of U.S. Provisional Application No. 62/715,738, filed on 7 Aug. 2018, each of which is incorporated in its entirety by this reference.

TECHNICAL FIELD

This invention relates generally to the field of personal mobility and more specifically to a new and useful articulating, self-centering truck for a personal mobility vehicle in the field of personal mobility.

DESCRIPTION OF THE EMBODIMENTS

Figure 1A:
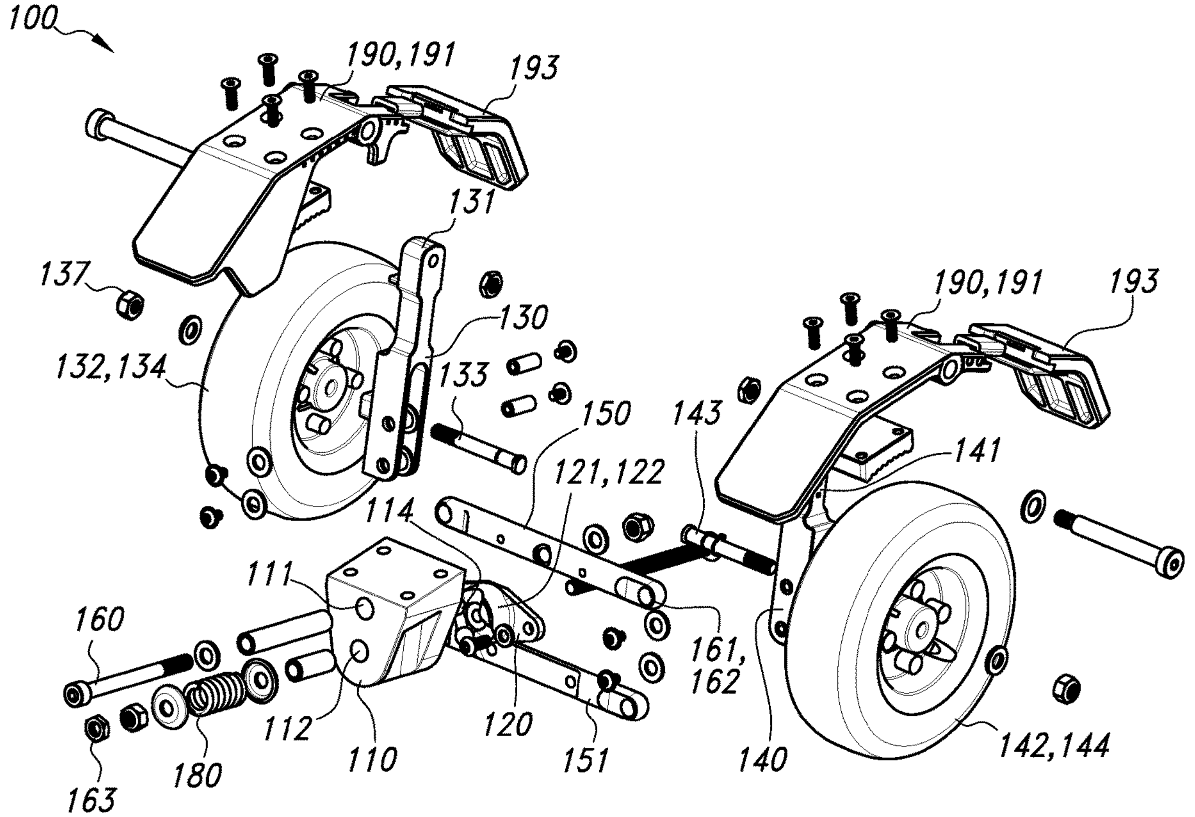
FIGS. 1A and 1B are schematic representations of a truck.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Truck

As shown in FIGS. 1A, 1B, 2A, and 2B, a truck 100 of a personal mobility vehicle 200 (e.g., a human-powered or motorized scooter, a skateboard) includes: a cam block 110; a pivot block 120; a right wheel upright 130; a right wheel axle 133 extending outwardly from the right wheel upright 130 and configured to locate a right wheel assembly 132; a left wheel upright 140; a left wheel axle 143 extending outwardly from the left wheel upright 140 and configured to locate a left wheel assembly 142; an upper lateral link 150 coupled to the right wheel upright 130 and the left wheel upright 140 and coupled to and pivoting about the upper pivot bore 111; a lower lateral link 151 coupled to the right wheel upright 130, the left wheel upright 140 below the upper lateral link 150, and the pivot block 120 between the right wheel upright 130 and the left wheel upright 140; and a spring element 180. The cam block 110 is configured to mount to a deck 212 of a personal mobility vehicle 200 and defines: an upper pivot bore 111; a lower pivot bore 112 located below the upper pivot bore 111; and a set of cam lobes 114 arranged about the lower pivot bore 112. The pivot block 120: is coupled to and pivots about the lower pivot bore 112; and defines a set of followers 122 configured to ride over the set of cam lobes 114. The spring element 180 is coupled to the pivot block 120 and is configured to drive the set of followers 122 of the pivot block 120 against the set of cam lobes 114 of the cam block 110 to bias the lower lateral link 151 toward a neutral position.

One variation of the system includes a cam block 110: configured to mount to a deck 212 of a scooter and defining: a first pivot feature (e.g., a bore, a counterbore 113, a threaded shaft); a second pivot feature vertically offset from the first pivot feature; a set of cam lobes 114 arranged about the second pivot feature; and a set of cam heels 115 between the set of cam lobes 114. This variation of the system also includes a pivot block 120: coupled to and pivoting about the second pivot feature; and defining a set of followers 122 configured to ride over the set of cam lobes 114. This variation of the system further includes: a pair of wheel uprights configured to locate a pair of wheel assemblies; a first lateral link extending between and coupled to the pair of wheel uprights and coupled to and pivoting about the first pivot feature; and a second lateral link extending between and coupled to the pair of wheel uprights, vertically offset from the first lateral link, and coupled to the pivot block 120 between the pair of wheel uprights. In this variation, the system also includes a spring element 180 coupled to the pivot block 120 and configured to drive the set of followers 122 of the pivot block 120 into the set of cam heels 115 to bias the second lateral link toward a neutral position.

A similar variation of the system includes: a deck 212 configured to support a user; a cam block 110 mounted to the deck 212 and defining a first pivot feature, a second pivot feature vertically offset from the first pivot feature, and a first set of lobes arranged about the second pivot feature; a pivot block 120 coupled to and pivoting about the lower pivot feature and defining a second set of lobes configured to ride over the first set of lobes; a right wheel upright 130; a left wheel upright 140; a right wheel assembly 132 mounted to the right wheel upright 130; a left wheel assembly 142 mounted to the left wheel upright 140; and a first lateral link pivotably coupled to the first pivot feature. This variation of the system also includes: a second lateral link coupled to the pivot block 120 and cooperating with the right wheel upright 130, the left wheel upright 140, and the first lateral link to form a four-bar linkage that locates the right wheel assembly 132 and the left wheel assembly 142 on the cam block 110. This variation of the system further includes a spring element 180 coupled to the pivot block 120 and configured to drive the set of followers 122 in the pivot block 120 against the set of cam lobes 114 of the cam block 110 to bias the lower lateral link 151 toward a neutral position, the cam block 110 and the pivot block 120 cooperating to locate a top of the deck 212 parallel to the second lateral link in the neutral position.

2. Scooter

Figure 12A:
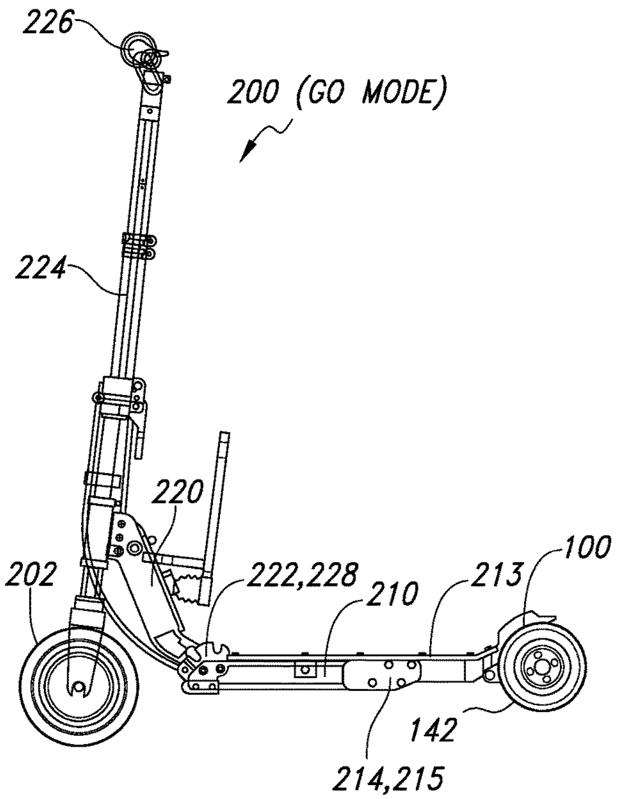
FIGS. 12A, 12B and 12C are schematic representations one variation of the personal mobility vehicle.
Figure 12B:
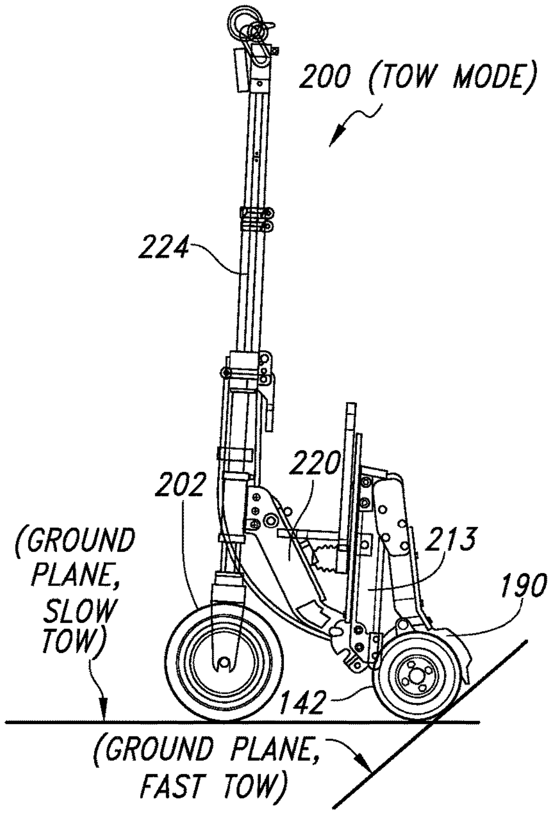
Figure 12C:
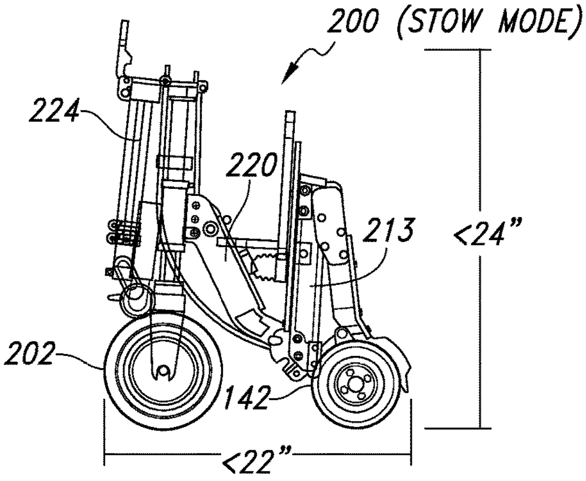

The truck 100 is described herein as installed (e.g., at time of manufacture or retrofit) at the rear of a manually-powered or motorized three-wheeled scooter to form a "rear truck." As shown in FIGS. 12A, 12B, and 12C, the scooter can include: a deck 212 configured to support a rider; the truck 100 supporting a pair of rear wheel assemblies and mounted to the rear of the deck 212; a stem 224 mounted to the front of the deck 212 and coupled to a front wheel assembly 202 (e.g., a hub motor, wheel, and tire assembly); a handlebar 226 connected to the step opposite the front wheel assembly 202; a throttle assembly coupled to the handlebar 226; a battery (e.g., arranged in the deck 212) configured to supply electrical energy to the front wheel assembly 202 responsive to actuation of the throttle assembly.

Figure 13:
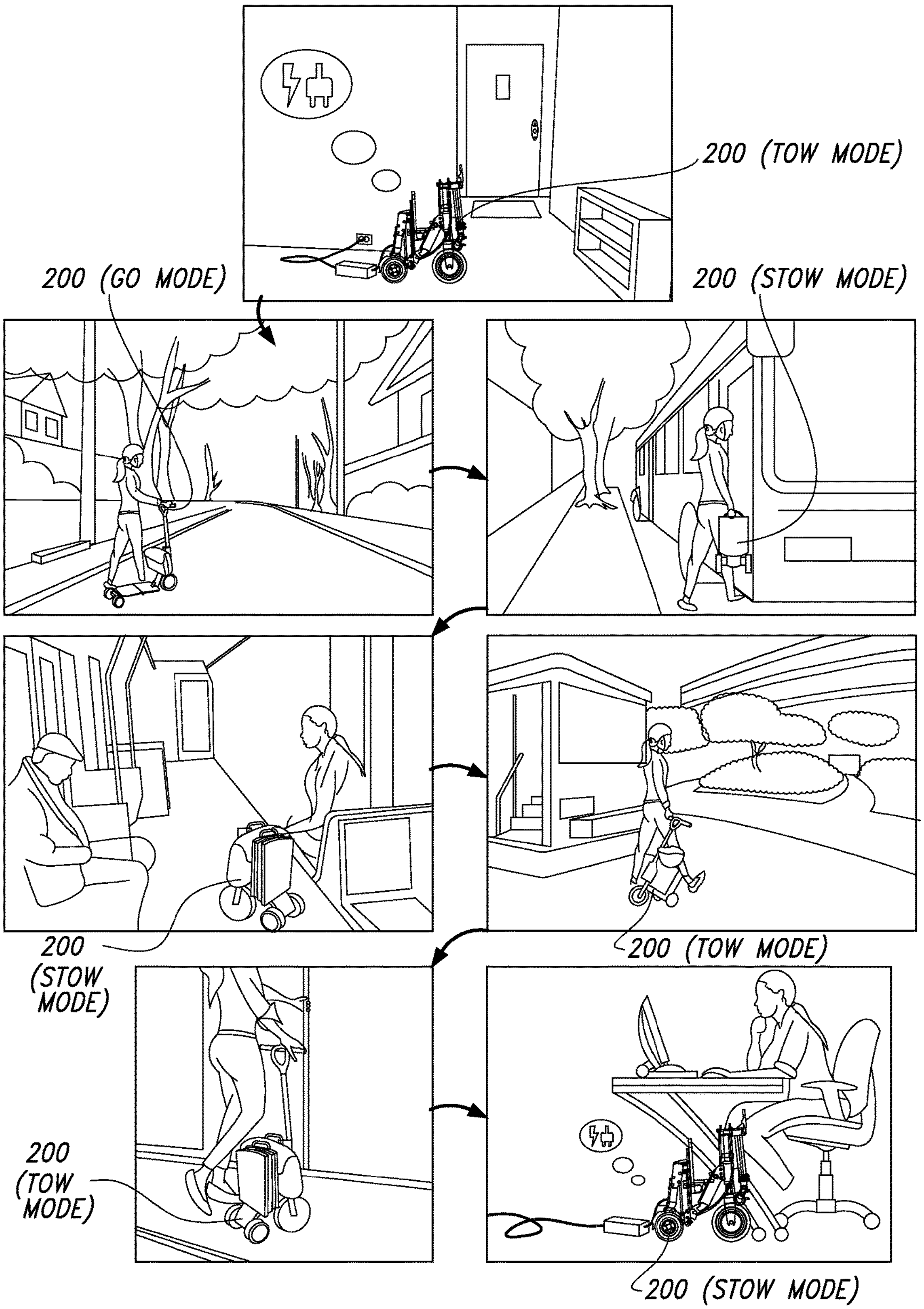
FIG. 13 is a flowchart representation of one variation of the personal mobility vehicle.

In one variation shown in FIG. 13, the deck 212 is segmented into a front deck section 210 and a rear deck section 213 that are configured to fold (or "collapse") about a deck hinge 214 in order to enable a rider to transition the scooter between "go," "tow," and "stow" modes (i.e., operable, lugging, and storage states). In this variation, the deck 212 includes: a front deck section 210 supporting the stem 224 and front wheel assembly 202; a rear deck section 213 supporting the rear truck 100 opposite the front deck section 210; a deck hinge 214 interposed between the front deck section 210 and the rear deck section 213; and a deck latch configured to selectively lock the deck hinge 214 in the closed deck position. In this variation, the deck hinge 214 can be operable in: an open deck position to locate the front deck section 210 tangent to the rear deck section 213 to form a substantially continuous and substantially planar deck surface and to locate the scooter in a long-wheelbase configuration; and in a closed deck position to separate the front deck section 210 from the rear deck section 213, to locate the scooter in a short-wheelbase configuration, and to locate the deck hinge 214 above the front and rear wheel assemblies.

2. Applications

Generally, the system defines a truck 100 for a personal mobility vehicle 200 and includes: a spring element 180; a cam block 110 affixed to a deck 212 of the personal mobility vehicle 200 and defining a multi-lobed cam pivot block 120 pivotably coupled to the cam block 110 and sprung against the set of cam lobes 114 of the cam block 110 by the spring element 180; and a four-bar linkage—including a pair of wheel uprights connected by a pair of (parallel) lateral links—that locates a pair of wheel axles and a pair of rear wheel assemblies. A first lateral link in this pair is pivotably coupled to the cam block 110, and a second (e.g., lower) lateral link is mounted to the pivot block 120. The spring element 180 drives a set of followers 122 arranged on the distal end of the pivot block 120 into the set of cam lobes 114 of the cam block 110 to bias the second lateral link toward a neutral position in which the second lateral link is approximately parallel to a surface of the deck 212.

For example, the personal mobility vehicle 200 can include a three- or four-wheeled manually-powered or electric scooter or skateboard. The cam block 110 defines: an upper pivot bore 111; a lower pivot bore 112; a counterbore 113 arranged about the lower pivot bore 112; and a tri-lobed cam including a set of three cam lobes 114 separated by a set of three cam heels 115 arranged in the base of the counterbore 113 and distributed radially about the lower pivot bore 112. The pivot block 120: can include a boss arranged in the counterbore 113; can include a set of followers 122 arranged on the distal end of the boss and driven into the cam heels 115 in the base of the counterbore 113 by the spring element 180; and can be pivotably coupled to the lower pivot bore 112 by a lower longitudinal shaft 161. A lower lateral link 151 can be fastened to or physically coextensive (e.g., defining a unitary structure with) the pivot block 120. An upper longitudinal shaft 160 can pivotably couple the upper lateral link 150 to the cam block 110. The spring element 180: can include a coil spring arranged between the cam block 110 and an end of the lower longitudinal shaft 161 opposite the pivot block 120; and can draw the boss of the pivot block 120 into the counterbore 113 to maintain engagement between the followers 122 and the cam lobes 114, drive the followers 122 in to the cam heels 115, bias the lower lateral link 151 toward the neutral position, and thus bias the scooter toward an upright position in which the surface of the deck 212 is approximately parallel with an adjacent ground surface.

Thus, with the truck 100 is mounted to the deck 212 of the scooter, the followers 122 on the end of the pivot block 120 can ride up the cam lobes 114 in the cam block 110 as the deck 212 of the scooter rolls (or "pivots") about its roll axis, such as when a rider leans (or "carves") the scooter around a turn. As the followers 122 ride up the cam lobes 114, the cam lobes 114 can drive the pivot block 120 out of the cam block 110, thereby compressing the spring element 180, increasing a spring force applied by the spring element 180 between the cam block 110 and the pivot block 120, and increasing a restoring force on the pivot block 120 to drive the followers 122 back toward the cam heels 115 and thus return the deck 212 to the neutral (e.g., horizontal) position. Therefore, the pivot block 120, the cam block 110, and the spring can cooperate to automatically bias the truck 100 to the neutral position, thereby: maintaining a high degree of stability of the deck 212 even when stopped; and enabling a rider to more easily mount the scooter, balance on the deck 212, maneuver the scooter at low speed, and dismount the scooter once stopped.

More specifically, the pivot block 120, the cam block 110, and the spring element 180 can cooperate to: self-center and stabilize the four-bar linkage—defined by the upper and lower lateral links and the left and the right wheel uprights—back to a neutral position following changes in weight distribution on the deck 212 (e.g., when the rider steps onto or off of the deck 212 or when the rider rotation leans through a turn, each of which may tilt or rotate the deck 212 and apply a torque to the cam block 110); exhibit increasing resistance to roll at greater roll angles of the deck 212; prevent excess roll of the deck 212; and enable the rear wheel assemblies to maintain ground contact (and steer) over a wide range of lean angles, thereby yielding greater stability, comfort, and control for the rider throughout a range of operational speeds and maneuvers.

3.1 Example

In one example shown in FIG. 3, the cam block 110 includes: an upper pivot bore 111; a lower pivot bore 112 offset below the upper pivot bore 111; and a set of (e.g., three) hemi-spherical receptacles radially offset by 120° about the lower pivot bore 112 and configured to accept a complementary set of hardened steel spherical bearings that cooperate to form the set of cam lobes 114. In this example, the upper lateral link 150 is mounted to the cam block 110 via an upper longitudinal shaft 160 that runs through the upper pivot bore 111. The pivot block 120: is mounted to the lower lateral link 151; defines a set of three complementary followers 122 opposite the lower lateral link 151 and configured to run against the cam lobes 114 formed by the set of spherical bearings in the cam block 110; and is pivotably coupled to the cam block 110 via a lower longitudinal shaft 161 that runs through the lower pivot bore 112. The spring element 180: is arranged between a retainer 163 (e.g., a threaded nut) on a distal end of the lower longitudinal shaft 161—opposite the pivot block 120—and the cam block 110; and is configured to pull (or "tension," "draw") the followers 122 of the pivot block 120 into the cam lobes 114 in the cam block 110.

The spring element 180 thus exerts a linear force—parallel to a longitudinal axis of the cam block 110 and/or parallel to the sagittal plane of the deck 212—on the pivot block 120 to drive the followers 122 of the pivot block 120 into cam heels 115 between the cam lobes 114 and to thus retain the truck 100 in a neutral position. When a change in weight distribution on the deck 212 causes the deck 212 to pivot about its roll axis relative to the ground during operation, the cam block 110 similarly rolls relative to the ground, thereby: pivoting the cam lobes 114 relative the followers 122 on the pivot block 120, which is located in a (nearly) fixed roll orientation by the four-bar linkage and the wheel assemblies; driving the followers 122 off of the cam heels 115 and up the cam lobes 114; driving the pivot block 120 out of (e.g., rearward) the cam block 110; and (further) compressing the spring element 180 between the cam block 110 and the retainer 163. When (further) compressed, the spring element 180 exerts an increasing linear force—parallel to the longitudinal axis of the cam block 110 and/or parallel to the sagittal plane of the deck 212—to force the followers 122 of the pivot block 120 back down the cam lobes 114.

Furthermore, contact between the followers 122 in the pivot block 120 and the cam lobes 114 in the cam block 110 can transform this linear force applied by the spring element 180 into a torque (or a "restoring force") on the lower lateral link 151 opposite and proportional to the roll angle of the deck 212, thereby stabilizing the deck 212, preventing excess roll of the deck 212 during operation, and automatically biasing the deck 212 back to the neutral position.

Furthermore, in the foregoing example, the spherical bearings in the cam block 110 can rotate within their hemi-spherical receptacles and can roll along followers 122 of the pivot block 120 as the deck 212 tilts about its roll axis, thereby reducing friction and wear along the cam lobes 114 and the followers 122.

Figure 2A:
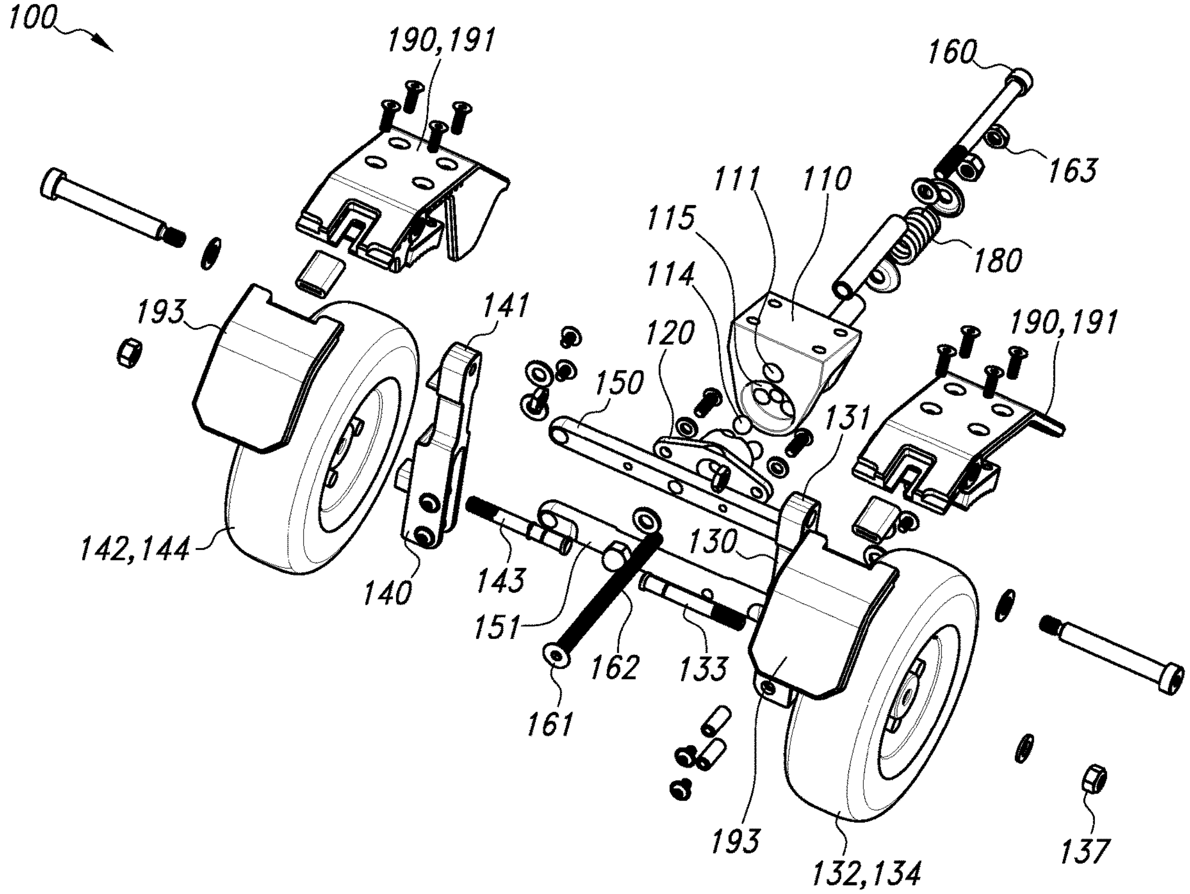
FIGS. 2A and 2B are schematic representations one variation of the truck.

In this example, and as shown in FIGS. 1A and 2A, the left and right wheel axles 143, 133 can extend outwardly from the left and right wheel uprights 140, 130, respectively, above a lateral centerline between the upper and lower lateral links 150, 151, thereby setting the roll center of the truck 100 below the wheel axles and improving the stability of the scooter throughout a range of operational speeds.

3.2 Adjustment

Additionally, the truck 100 can enable a rider to customize the restoring force applied by the truck 100 to the personal mobility vehicle 200 (hereinafter the "scooter")—such as per degree of roll of the deck 212—and therefore customize stability of the deck 212. For example, the rider or a technician may exchange a weaker spring element (e.g., a first coil spring or elastomeric bushing exhibiting a first spring constant) for a stiffer spring element 180 (e.g., a second coil spring or elastomeric bushing exhibiting a second spring constant greater than the first spring constant) in order to increase the restoring force applied by the truck 100 per degree of roll of the deck 212 and thus increase stability of the scooter both when stopped and when in motion. Conversely, the rider or a technician may exchange the stiffer spring element 180 for the weaker spring element 180 in order to decrease this restoring force applied by the truck 100 per degree of roll of the deck 212 and thus enable more rapid carving (or "slalom") motions with the scooter in motion.

Additionally or alternatively, the scooter can include a mechanical or electromechanical dynamic stability control configured to adjust preload of the spring element 180 during operation of the scooter. For example, the truck 100 can include a nut threaded onto the lower longitudinal shaft 161 between the spring element 180 and the leading end of the lower longitudinal shaft 161. In this example, a foot-operated pedal—mounted near a rear of the deck 212—can include a bimodal ratchet coupled to the nut via a set of cables. Manual operation of the foot pedal in a first ratchet mode (e.g., in a first direction) can thus tighten the nut on the lower longitudinal axle, compress the spring element 180, increase preload of the spring element 180, and thus increase the restoring force applied by the truck 100 on the deck 212 over the full range of roll angles of the scooter. Conversely, manual operation of the foot pedal in a second ratchet mode (e.g., in a second direction) can loosen the nut on the lower longitudinal axle, release the spring element 180, decrease preload of the spring element 180, and thus decrease the restoring force applied by the truck 100 on the deck 212 over the full range of roll angles of the scooter.

In a similar example, the scooter can include a hand-actuated lever mounted on its handlebars 226 and similarly coupled to the nut such that manual operation of the hand-actuated lever by the rider adjusts the nut on the lower longitudinal axles and thus adjusts preload of the spring element 180.

In a similar implementation, the system includes a gearhead motor coupled to the nut—such as via toothed gears or a timing belt—and can rotate the nut on the lower longitudinal shaft 161 to selectively tighten and loosen the nut on the lower longitudinal axles and thus adjust preload of the spring element 180, such as: responsive to manual input at an electronic button or other control interface on the handlebars 226 of the scooter; or responsive to a control output of a stability control module 170 in the scooter (e.g., as a function of speed of the scooter). For example, the stability control module 170 can: monitor the speed of the scooter based on a wheel speed of the front wheel assembly 202 of the scooter; automatically actuate the gearhead motor in a first direction to tighten the nut, increase preload of the spring element 180, and thus increase stability of the scooter at low speeds (e.g., below 3 miles per hour) and at high speeds (e.g., above 15 miles per hour); and automatically actuate the gearhead motor in a second direction to loosen the nut, decrease preload of the spring element 180, and thus to increase mobility of the scooter at moderate speeds (e.g., between 3 miles per hour and 15 miles per hour).

3.3 Other Vehicles

While the truck 100 is described herein as a rear truck 100 for a motorized, three-wheeled scooter with a folding (e.g., collapsible) deck 212 as described above, the truck 100 can be additionally or alternatively mounted to: the front or rear of a motorized scooter with a fixed deck 212; a manual (e.g., non-motorized) scooter; a long-board; a short skateboard; a street luge; a seated scooter; or a personal mobility vehicle 200 of any other type. The truck 100 can thus define a front or rear truck 100 configured to improve roll stability of the vehicle and thus increase rider comfort over a range of operating speeds of the vehicle. Additionally and/or alternatively, components of the truck 100 can be resized and mounted to a longboard, a short skateboard, a street luge, a seated scooter, or other personal mobility vehicle 200 to improve stability (and/or enable adjustable stability controls) of the vehicle and increase rider comfort during operation.

4. Four-Bar Linkage and Wheel Axles

Figure 1B:
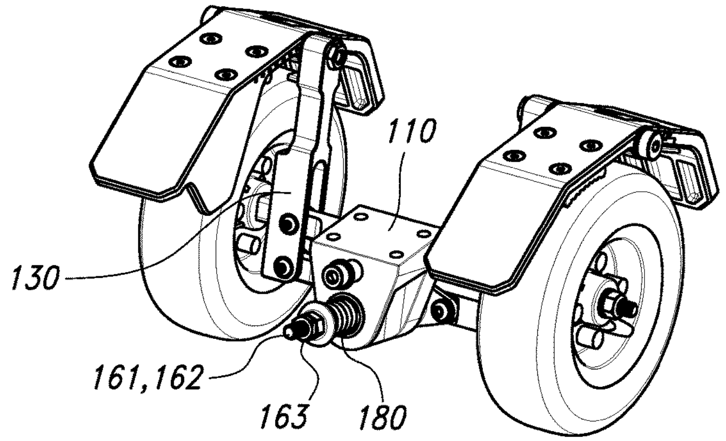
Figure 2B:
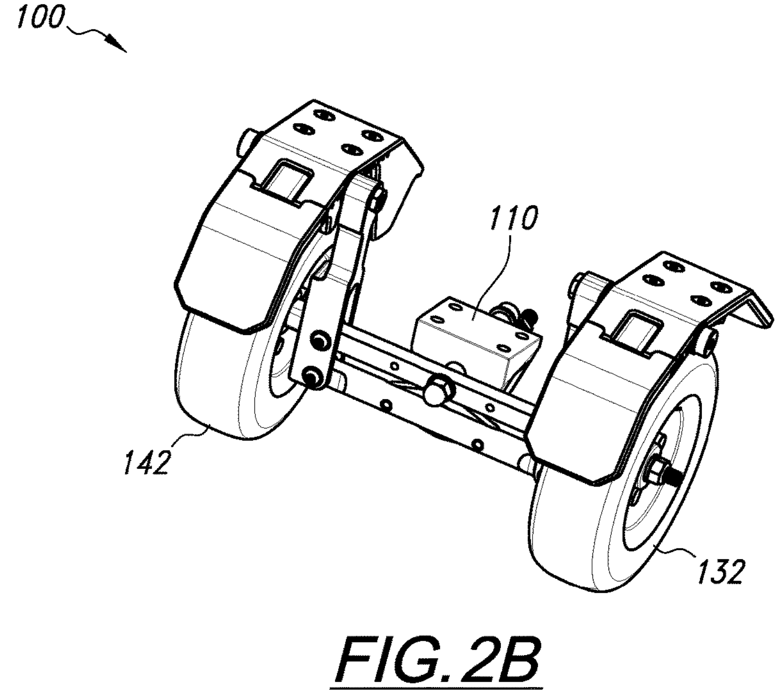

As shown in FIGS. 1B and 2B, the truck 100 includes a four-bar linkage pivotably coupled to the cam block 110 and configured to locate a pair of wheel axles and a pair of wheel assemblies. In particular, the four-bar linkage includes: an upper lateral link 150 pivotably coupled to the cam block 110 via an upper longitudinal shaft 160; a lower lateral link 151 mounted to (e.g., rigidly coupled to) the pivot block 120, which is pivotably coupled to the cam block 110 via a lower longitudinal shaft 161; a right wheel upright 130 pivotably coupled (or "pinned") to the right ends of the upper and lower lateral links 150, 151 and supporting a right wheel assembly 132; and a left wheel upright 140 pivotably coupled to the left ends of the upper and lower lateral links 150, 151 and supporting a left wheel assembly 142.

In one implementation, the upper lateral link 150 and the lower lateral link 151 include aluminum (6061 aluminum, 7075 aluminum) or steel (e.g., 303 stainless steel) struts of similar or identical widths. For example, the upper and lower lateral links 150, 151 can be forged and/or machined from billet.

The left and right wheel uprights 140, 130 can be machined, cast, forged, or molded, etc. in aluminum, steel, or a fiber-reinforced composite, etc. In one example shown in FIGS. 1A and 2A, the left and right wheel uprights 140, 130 are configured to fasten to the ends of the upper and lower lateral links 150, 151 with pairs of shoulder bolts.

The left and right wheel uprights 140, 130 can also include integral (e.g., overmolded) wheel axles, or the wheel axles can be assembled (e.g., pressed) into the left and right wheel uprights 140, 130. For example, the left and right wheel axles 143, 133 can include solid, hardened-steel axles and can be pre-machined and press-fit into axle bores in the left and right wheel uprights 140, 130. However, the upper and lower lateral links 150, 151 and the left and right wheel uprights 140, 130 can be of any other material and can be manufactured in any other way.

As described below, when the four-bar linkage is assembled, the left and right wheel axles 143, 133 can extend outwardly from the left and right wheel uprights 140, 130 with the axes of the left and right wheel axles 143, 133 located above a horizontal centerline between the upper and lower lateral links 150, 151 such that: the roll center of the truck 100 is below the axes of the wheel assemblies; and such that load on the deck 212 of the scooter (e.g., the rider) carried into the cam block 110 naturally rights the truck 100 (i.e., biases the truck 100 into the neutral position), thereby improving stability of the scooter both when stopped and when in motion.

For example, the right wheel upright 130 can include: a right upper junction pivotably coupled to the right end upper lateral link 150; and a right upper junction arranged below the right upper junction and pivotably coupled to the right end of the lower lateral link 151. Similarly, the left wheel upright 140 can include: a left upper junction pivotably coupled to the left end upper lateral link 150; and a left lower junction arranged below the left upper junction and pivotably coupled to the left end of the lower lateral link 151. In this example, the right wheel axle 133 extends outwardly from the right wheel upright 130 and is arranged above a horizontal centerline between the right upper junction and the right lower junction to locate a roll center of the upper lateral link 150 and the lower lateral link 151 below the right wheel axle 133. Similarly, the left wheel axle 143 extends outwardly from the left wheel upright 140 and is arranged above the horizontal centerline between the left upper junction and the left lower junction to locate the roll center of the upper lateral link 150 and the lower lateral link 151 below the left wheel axle 143.

Figure 4:
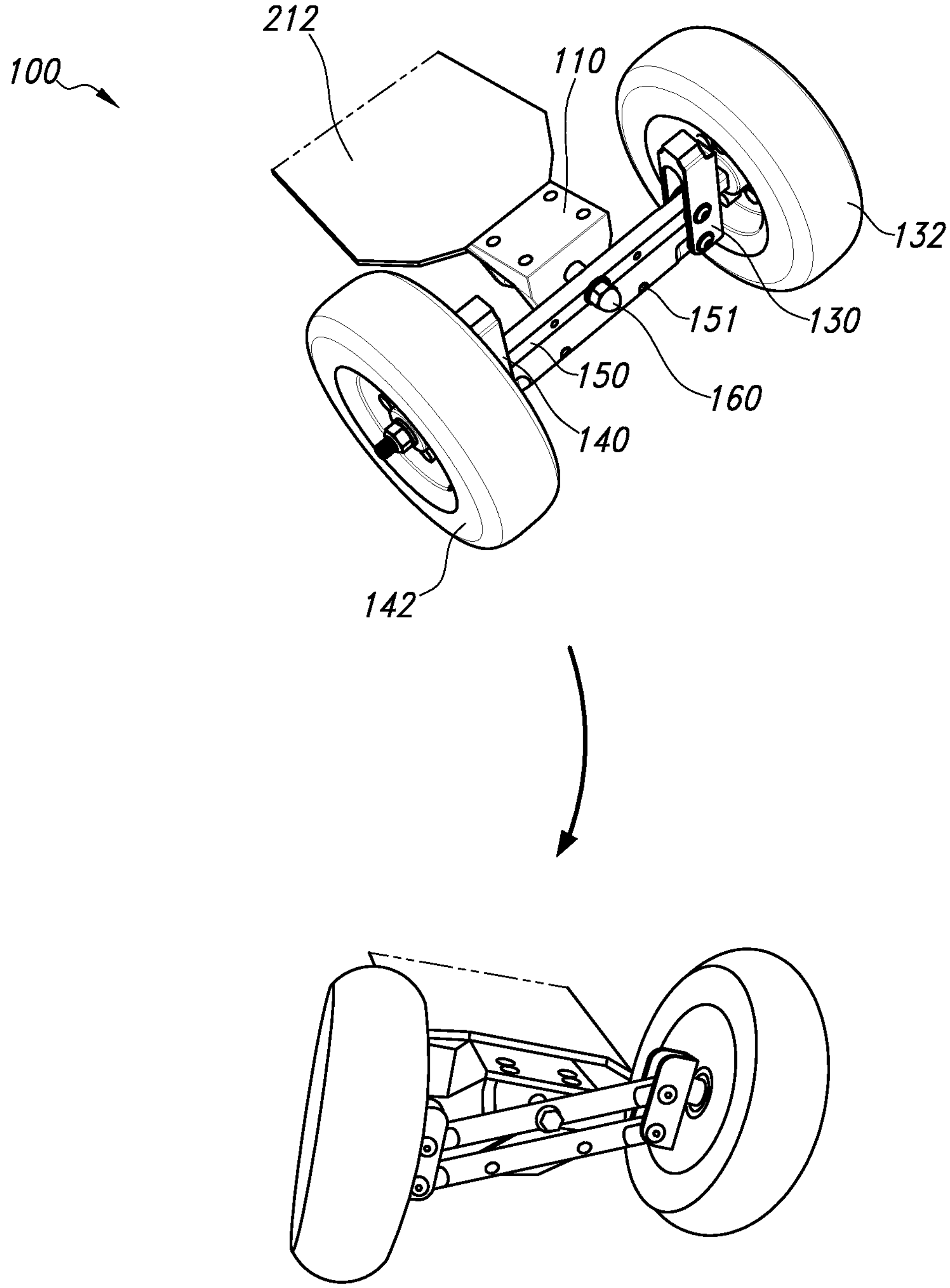
FIG. 4 is a flowchart representation of one variation of the truck and a personal mobility vehicle.

In one implementation shown in FIG. 4, the upper and lower lateral links 150, 151 and the left and right wheel uprights 140, 130 form a parallelogram and thus cooperate to maintain a roll angle between the left and right wheel axles 143, 133—and therefore the left and right wheels 144, 134—over a range of deck 212 roll angles. For example, while no load is applied to the deck 212 or while the weight of the rider is laterally balanced over the deck 212, the upper lateral link 150, the lower lateral link 151, and the left and right wheel uprights 140, 130 are biased (e.g., by gravity, the weight of the rider, and/or the spring element 180) into a rectangular arrangement in which the four-bar linkage locates left and right wheel axles 143, 133 coaxially. However, when the rider then shifts her weight laterally over the right side of the deck 212, the deck 212 rolls clockwise, thereby shifting the upper longitudinal axle rightward and the lower longitudinal shaft leftward, rolling the left and right wheel uprights 140, 130 clockwise, inclining the left and right wheels 144, 134 to the right, increasing contact force between the outer corner of the right wheel 134 and pavement, increasing contact force between the inner corner of the left wheel 144 and pavement, and shifting the effective contact patches of the left and right wheels 144, 134 rightward to balance the rider's shifted weight.

Furthermore, the upper and lower pivot bores 111, 112 in the cam block 110 can be inclined toward the front of the truck 100 (e.g., by 10°) such that the four-bar linkage locates the wheels with positive caster (e.g., 10°) and induces bump-steer when the four-bar linkage is upset from the rectangular arrangement (e.g., when the rider leans leftward or rightward on the deck 212), thereby enabling the right to steer the scooter by leaning on the deck 212 (or "carving").

5. Pivot Block and Cam Block

Figure 3:
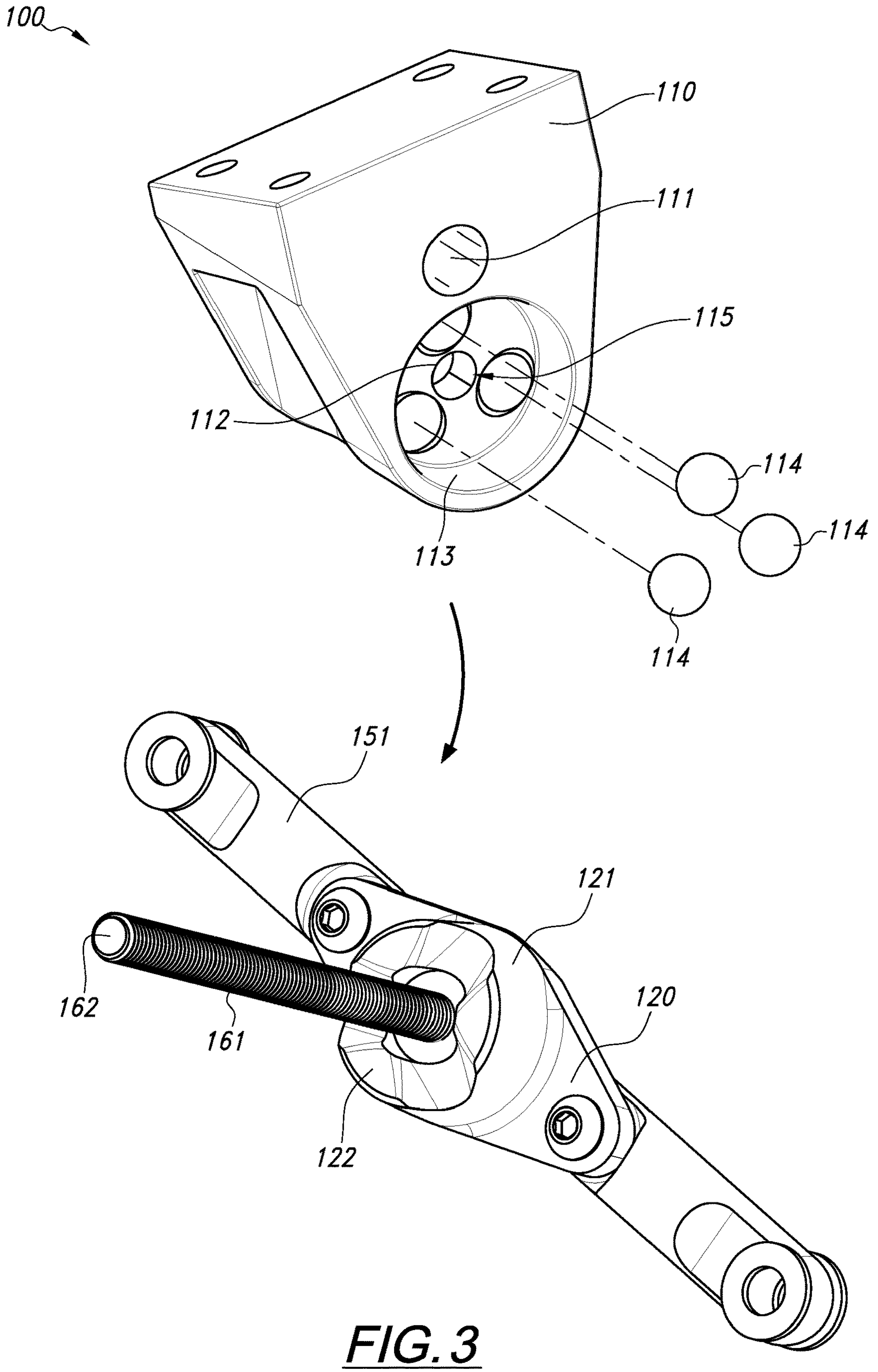
FIG. 3 is a schematic representation of one variation of the truck.

As shown in FIG. 3, the truck 100 includes a cam block 110 and a pivot block 120 interposed between the cam block 110 and the lower lateral link 151.

The cam block 110 can be cast, molded, forged, and/or machined, etc. (e.g., in steel or aluminum) to include: a mounting flange configured to fasten to a deck 212; an upper pivot bore 111; a lower pivot bore 112; and a counterbore 113 centered about the lower pivot bore 112 and inset from the rear of the cam block 110. In one implementation, the counterbore 113 defines a cylindrical section coaxial with the lower pivot bore 112 and a set of three hemispherical bores—inset from the base of the counterbore 113—spaced radially about the lower pivot bore 112. A set of three hardened-steel spherical bearings are then installed in these hemispherical bores to form a multi-lobed cam configured to mate with three corresponding lobes in the pivot block 120. For example, these spherical bearings can be bonded and fixed in these bores. Alternatively, these spherical bearings can be sized for a running fit (e.g., 0.0005 undersized radius) within the hemispherical bores and can be greased before installation in these bores such that these spherical bearings rotate within their bores when running along followers 122 in the pivot block 120.

Accordingly, the pivot block 120 can include a cylindrical boss 121 extending forward from the lower lateral link 151, undersized for a sliding fit within the counterbore 113, and including a coaxial axle bore. The leading face of the cylindrical boss 121 can include a set of radially-patterned followers 122 configured to mate with the set of cam lobes 114 defined by spherical bearings in the base of the counterbore 113 of the cam block 110. For example, the pivot block 120 can be cast, forged, molded, sintered, and/or machined in bronze (e.g., for reduced wear of the followers 122 running along the set of cam lobes 114), steel, or aluminum.

5.1 Adjustable Thrust Angle

Additionally or alternatively, the pivot block 120 can include a separate faceplate—in a hardened material (e.g., steel) and/or low-wear material (e.g., bronze, nylon)—that defines the set of radially-patterned followers 122 and keys into the leading face of the cylindrical boss 121. In this implementation (and similar to the variation shown in FIG. 5), the truck 100 can include a set of replaceable faceplates defining different follower profiles, such as: a high-rake (e.g., a high thrust angle) profile that produces a restoring force that increases rapidly with greater roll angles; a low-rake (e.g., a lower thrust angle) profile that produces a restoring force that increases less rapidly with greater roll angles; and alternative profiles that produce non-linear restoring forces as a function of roll angle. The rider or a technician may therefore replace these faceplates on the pivot block 120 to modify thrust angle between the cams in the cam block 110 of followers 122 in the pivot block 120 and thus modify a relationship between roll angle of the cam block 110 and the restoring force applied by the truck 100.

In a similar variation, the truck 100 includes a kit of pivot blocks 120, wherein each pivot block 120 includes a set of integral followers 122 that define a unique profile within the kit. The rider or a technician may therefore exchange whole pivot blocks 120 in the truck 100 with other pivot blocks 120 in the kit to modify thrust angle between the cams in the cam block 110 of followers 122 in the pivot block 120 and thus modify a relationship between roll angle of the cam block 110 and the restoring force applied by the truck 100.

5.2 Lower Longitudinal Shaft

The cam block 110 can also include a spring seat on a front side of the cam block 110 and coaxial with the lower pivot bore 112. A lower longitudinal shaft 161—such as in the form of a threaded shoulder bolt—can be inserted: into a longitudinal bore in the center of the lower lateral link 151; through the axle bore of the pivot block 120; through the lower pivot bore 112 of the cam block 110; and past the spring seat. The spring element 180 (e.g., a coil spring) can then be installed over the threaded end of the lower longitudinal shaft 161 extending fore of the spring seat, and a lower locknut can be threaded onto the threaded end of the lower longitudinal shaft 161 and tightened against the spring element 180, thereby drawing the followers 122 of the pivot block 120 into the cam heels 115 in the cam block 110 and centering the lower lateral link 151 in a "neutral" position.

5.3 Upper Longitudinal Shaft

Similarly, an upper longitudinal shaft 160—such as in the form of a threaded shoulder bolt—can be inserted: into a longitudinal bore in the center of the upper lateral link 150; and through the upper pivot bore 111 of the cam block 110. An upper locknut can be threaded onto the threaded end of the lower longitudinal shaft 161 and tightened against the cam block 110 (or a thrust washer), fastening the upper lateral link 150 to the cam block 110.

Thus, when the deck 212 rotates about its roll axis, the cam block 110 can track with the roll orientation of the deck 212 and rotate relative to the pivot block 120, which drives the followers 122 of the pivot block 120 out of the cam heels 115 and up the set of cam lobes 114, thereby: displacing the pivot block 120 rearward; decreasing caster of the left and right wheel uprights 140, 130; drawing the lower longitudinal shaft 161 rearward; further compressing the spring element 180 between the lower locknut and the spring seat; and increasing the restoring force applied by the set of cam lobes 114 on the pivot block 120.

5.4 Example

In one example of the foregoing implementations, the cam block 110 includes a housing defining: the upper pivot bore 111; the lower pivot bore 112; and a set of hemi-spherical receptacles. In this example, the cam block 110 also includes a set of (e.g., three) spherical bearings: of a first hardness; located in the set of hemi-spherical receptacles; and defining the set of cam lobes 114. In this example, the pivot block 120 includes a unitary structure: of a second hardness less than the first hardness; and defining the set of followers 122 configured to ride over the set of spherical bearings. In particular, in this example: the housing can include a cast aluminum structure; the set of spherical bearings can include hardened steel spherical bearings; and the pivot block 120 can include a unitary sintered-bronze structure.

In this example, the truck 100 can further include a lower longitudinal shaft 161: arranged in the lower pivot bore 112; and pivotably coupling the lower lateral link 151 and the pivot block 120 to the cam block 110. The cam block 110 can define: a counterbore 113 arranged about the lower pivot bore 112; and the set of cam lobes 114 in a base of the counterbore 113. The pivot block 120 defines: a cylindrical boss 121 supported by the counterbore 113 and configured to rotate about and translate along an axis through the lower pivot bore 112 responsive to a torque applied to the cam block 110; and the set of followers 122 on a face of the cylindrical boss 121.

Furthermore, in this example, the truck 100 can include a seal 123 arranged between the boss and the counterbore 113 and configured to seal a lubricant packed around the set of cam lobes 114 (e.g., the set of spherical bearings) and the set of followers 122.

5.5 Variation: Alternate Cam Lobe and Follower Configurations

In one variation, the foregoing cam and follower geometry is inverted such that: the pivot block 120 includes the set of cam lobes 114 and cam heels 115; and the cam block 110 defines a complementary set of radially-patterned followers 122. For example, in this variation: the pivot block 120 can include the set of hemispherical bores that locate the set of spherical bearings to form the set of cam lobes 114; and the cam block 110 can define a complementary set of radially-patterned followers 122.

In another variation, the cam block 110 (or the pivot block 120) defines a unitary structure that directly defines the set of cam lobes 114 and the set of cam heels 115.

5.6 Variation: Reversed Truck

As shown in FIG. 4, with the truck 100 installed on the rear of the scooter, the spring element 180: can be arranged on the leading end of the truck 100; and can draw the pivot block 120 forward into the cam block 110. In this configuration, forward motion and/or forward acceleration of the scooter (such as induced by a wheel upright motor in a puller configuration at the front of the scooter) can induce a load path through the scooter than pulls the rear wheel assemblies rearward, thereby reducing the contact force between the set of cams and the set of followers 122, which may reduce the "stiffness" of the truck 100, reduce stability of the rear of the scooter, and enable greater carving at increasing speeds and/or under greater acceleration. Braking at the rear wheel assemblies, such as described below can similarly induce a load path through the scooter than pulls the rear wheel assemblies rearward, thereby reducing the contact force between the set of cams and the set of followers 122, which may reduce the "stiffness" of the truck 100.

Therefore, in one variation, truck 100 is reversed on the rear of the scooter such that acceleration of the scooter (e.g., by the wheel upright motor at the front of the scooter) and braking of the scooter at the rear wheel assemblies induces a load path through the scooter that drives the cam block 110 into the pivot blocks 120, thereby increasing the contact force between the set of cams and the set of followers 122, which may increase the "stiffness" of the truck 100 and increase stability of the rear of the scooter at increasing speeds, under greater acceleration, and under braking.

5.6 Variation: Constant-Caster

Figure 5:
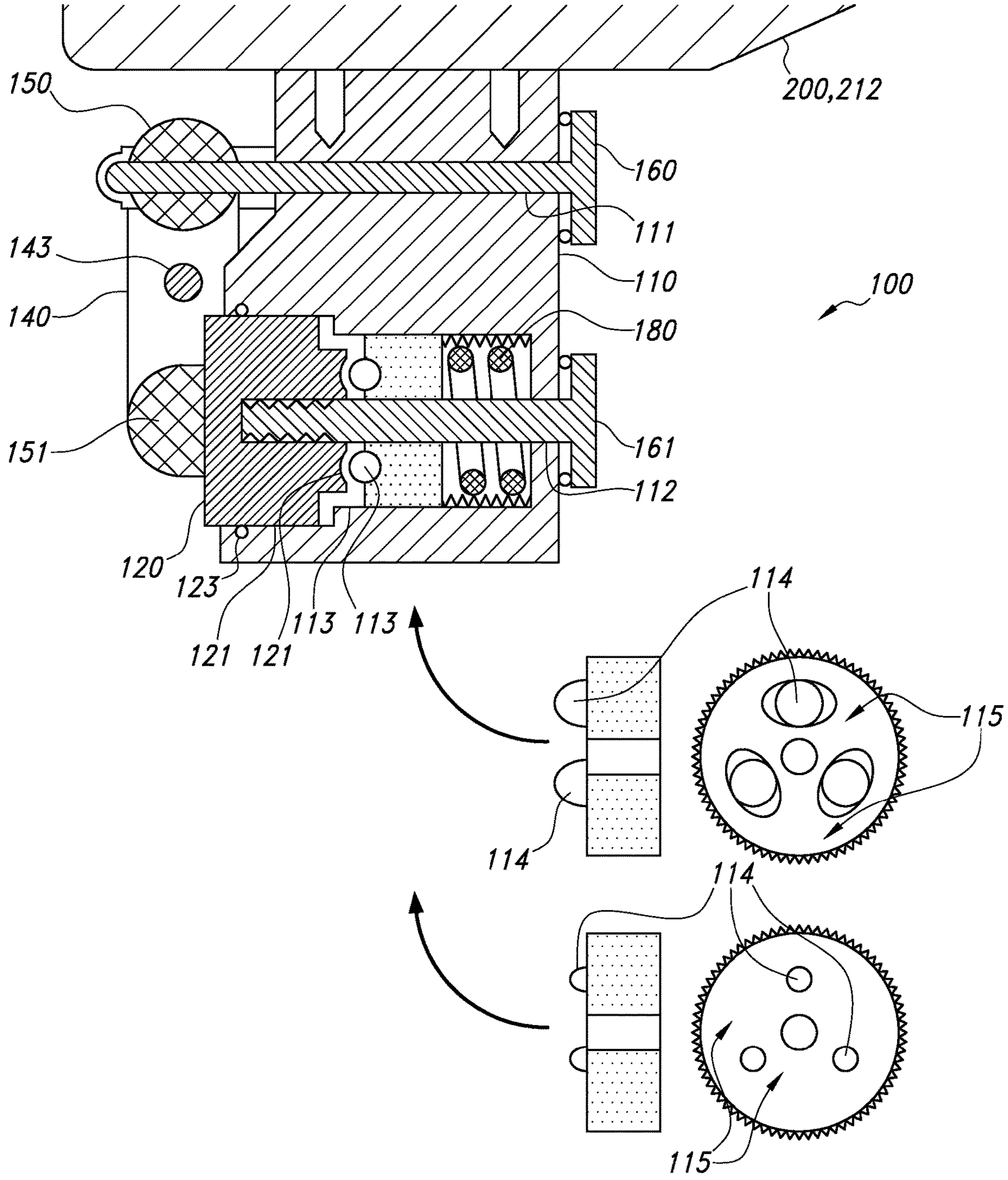
FIG. 5 is a schematic representation of one variation of the truck.

In one variation shown in FIG. 5, the pivot block 120 is pivotably coupled to the lower pivot bore 112 in the cam block 110 and located at a fixed longitudinal position on the cam block 110 such that the truck 100 retains the left and right wheels 144, 134 at a constant caster angle over a range of roll angles.

In one implementation, the cam block 110: defines a splined receptacle coaxial with the lower pivot bore 112; and includes a multi-lobed cam that runs in and is keyed to the splined receptacle. The multi-lobed cam defines the set of cam lobes 114 and the set of cam heels 115 arranged radially about the splined receptacle and the lower pivot bore 112. The pivot block 120 is pivotably coupled to the lower pivot bore 112 adjacent the splined receptacle. The spring element 180 biases the multi-lobed cam toward the pivot block 120 to drive the followers 122 of the pivot block 120 into the cam heels 115 and therefore bias the lower lateral link 151 to the neutral position.

For example, the lower longitudinal shaft 161 can run through the multi-lobed cam to pivotably couple the pivot block 120 to the cam block 110 and to constrain the longitudinal position of the pivot block 120—and therefore the lower lateral link 151—relative to the cam block 110. The multi-lobed cam can run in the splined receptacle and slide over the lower longitudinal shaft 161, and the spring element 180 can be located in a base of the cam block 110 between the cam block 110 and the multi-lobed cam to drive the multi-lobed cam toward the pivot block 120 and thus bias the lower lateral link 151 to the neutral position.

Thus, in this variation, the pivot block 120 and the cam block 110 can cooperate to both: compress the spring element 180 when the pivot block 120 is rotated off of the neutral position; and maintain the longitudinal position of the lower lateral link 151 on the pivot block 120, thereby maintaining the caster angle of the wheel uprights over the range of deck 212 roll angles.

6. Spring Element

As shown in FIGS. 1A, 2A, 5, and 6, the truck 100 includes a spring element 180 mounted between the deck 212 and the pivot block 120. Generally, the spring element 180 is configured to absorb and counter longitudinal displacement of the pivot block 120 relative to the cam block 110 as the deck 212 and the cam block 110 roll during operation of the scooter.

In particular, rotation of the cam block 110 relative to the pivot block 120, the lower lateral link 151, the wheel uprights, etc. during operation of the scooter (e.g., when a rider steps onto the scooter or navigates the scooter around a turn) rotates the cam block 110 relative to the pivot block 120, drives the set of followers 122 in the pivot block 120 up the set of cams in the cam block 110, and drives the cam block 110 and the pivot block 120 apart along the axis of the lower longitudinal shaft 161. Accordingly, separation of the pivot block 120 from the cam block 110 compresses the spring element 180, thereby increasing the force applied by the spring element 180 against to the pivot block 120 to drive the pivot block 120 and the cam block 110 back together. Therefore, the spring element 180 can exert a linear force on the lower longitudinal shaft 161 to pull followers 122 of the pivot block 120 into the cam heels 115 of the cam block 110, which translate this linear force into a torque—or "restoring force"—opposite the displacement of the deck 212 from the neutral position, thereby driving the truck 100 back to its neutral (or "upright") position. The spring element 180 can therefore cooperate with the pivot block 120 and the cam block 110 to improve roll stability of the scooter.

In one implementation shown in FIGS. 1A, 2A, 5, and 6, the spring element 180 includes a coil spring interposed between the cam block 110 and lower longitudinal shaft 161. However, the spring element 180 can include a spring of any other type (e.g., a urethane block, a hydraulic or pneumatic spring) and can be configured to apply an increasing restorative force to the pivot block 120 and the cam block 110 when compressed (or tensioned) responsive to rotation of the cam block 110—relative to the pivot block 120—away from the neutral position.

6.1 Spring Element Adjustment

In one implementation, the lower longitudinal shaft 161: is arranged in the lower pivot bore 112; pivotably couples the lower lateral link 151 and the pivot block 120 to the cam block 110; and includes a retention section 162 extending past the lower pivot bore 112 opposite the pivot block 120. In this implementation, the truck 100 also includes a retainer 163 arranged on the retention section 162 of the lower longitudinal shaft 161 and configured to retain the spring element 180 over the lower longitudinal shaft 161. In this implementation, the spring element 180: is arranged between the cam block 110 and the retainer 163; and tensions the lower longitudinal shaft 161 to bias the lower lateral link 151 toward the neutral position, the cam block 110 and the pivot block 120 cooperating to locate a top of the deck 212 parallel to the lower lateral link 151 in the neutral position.

For example, a threaded end of the lower longitudinal shaft 161 can define the retention section 162, and the retainer 163 can include a threaded nut. Accordingly, the rider (or a technician) may tighten the retainer 163 on the threaded end of the lower longitudinal shaft 161 to increase preload on the spring element 180 (e.g., a coil spring), thus increasing the restoring force applied by the truck 100 to the deck 212 over a full range of roll angles of the scooter.

Therefore, in this implementation, the retainer 163 can be adjustable on the lower longitudinal shaft 161 to modify preload on the spring element 180. Accordingly, the spring element 180 can control a) a face pressure between the set of cam lobes 114 in the cam block 110 and the set of followers 122 in the pivot block 120 and b) a minimum torque threshold—applied to the cam block 110 via the deck 212 of the scooter—to drive the lower lateral link 151 out of the neutral position that are proportional to preload on the spring element 180.

6.2 Kit of Spring Elements

In one variation, the truck 100 includes a kit of interchangeable spring elements 180 spanning a range of spring constants and/or free lengths. Thus, in this implementation, the rider or a technician may exchange spring elements 180 in the truck 100 in order to modify dynamics (e.g., stiffness, roll stability) of the scooter.

For example, the rider or the technician may exchange a weaker spring element 180 in the truck 100 for a stiffer spring element 180—such as by removing the nut described above from the threaded end of the lower longitudinal shaft 161 to release the weaker spring element 180, installing the stiffer spring element 180, and reinstalling the nut on the threaded end of the lower longitudinal shaft 161—in order to increase the restoring force applied by the truck 100 to the deck 212 of the scooter per degree of roll of the deck 212 and thus increase stability of the scooter when stopped and when at speed. Similarly, the rider or the technician may exchange a stiffer spring element 180 in the truck 100 for a weaker spring element 180 in order to decrease the restoring force applied by the truck 100 to the deck 212 of the scooter per degree of roll of the deck 212 and thus enable more rapid carving (or slalom) motions with the scooter.

7. Stability Customization and Controls

In one variation, the truck 100 includes or interfaces with a manual or electromechanical control module 170 to implement on-the-fly adjustment of preload of the spring element 180—and therefore implement on-the-fly adjustment of roll stability of the scooter.

7.1 Eccentric Retainer with Preload Range

Figure 6:
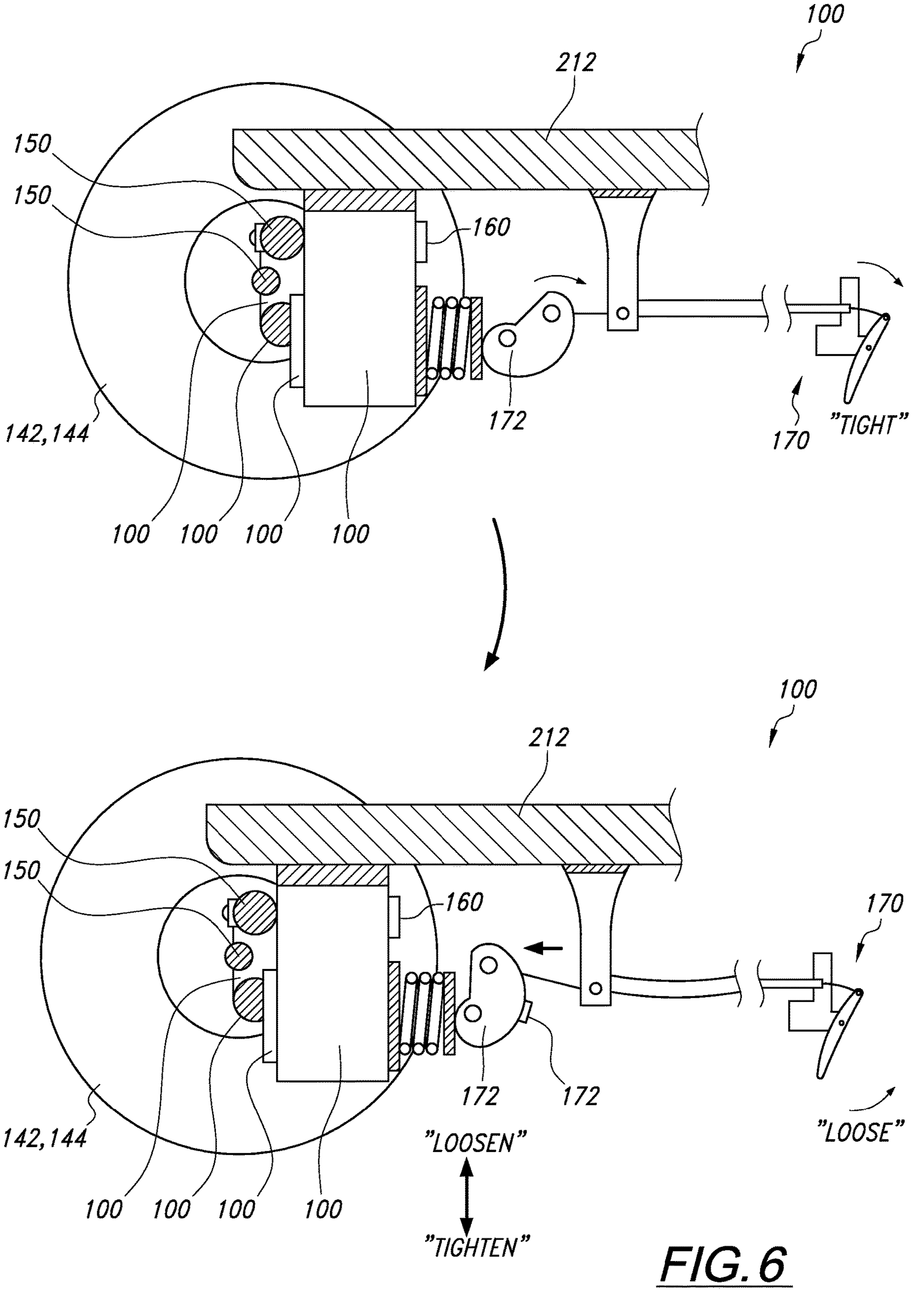
FIG. 6 is a schematic representation of one variation of the truck.

In one implementation shown in FIG. 6, a thrust washer is arranged on the lower longitudinal shaft 161 between the spring element 180 and the retainer 163 (e.g., the nut). An eccentric snail (or "drop") cam follower: is mounted to (or adjacent) the nut at the end of the lower longitudinal shaft 161; and defines an eccentric cam face that runs on the thrust washer opposite the spring element 180. (Alternatively, in this implementation, the snail cam can be interposed between the spring element 180 and the cam block 110.)

In this implementation, a control lever is mounted: to a handlebar 226 of the scooter for manipulation with a rider's hand or thumb during operation; or to the deck 212 of the scooter (e.g., near the rear of the deck 212) for operation by the rider's rear foot while riding the scooter. A pair of push-pull cables (e.g., braided steel cables) are coupled to the snail cam and to the control lever: such that movement of the control lever in a first direction rotates the snail cam in a first direction to drive the thrust washer up the eccentric cam face and increase preload of the spring element 180; and such that movement of the control lever in a second direction rotates the snail cam in a second direction to release the thrust washer down the eccentric cam face and decrease preload of the spring element 180.

For example, a novice rider may select and maintain the highest possible preload of the spring element 180 in order to maximize the roll stability and rigidity of the scooter. Conversely, an intermediate or advanced rider may select a lower preload of the spring element 180 in order to achieve faster, more responsive lean-steer or otherwise dynamically adjust the preload of the spring element 180 based on her speed, road conditions, etc.

7.2 Bi-Stable Eccentric Retainer

Alternatively, in the foregoing implementation, the control lever and/or the snail cam can be bi-stable such that actuation of the control lever transitions the snail cam between "high-preload" and "low-preload" positions. For example, the lower nut can be manually tightened by the rider—with the control lever in "high-preload" position by default—prior to operation of the scooter in order to set a preferred roll stability of the scooter, such as a high preload and high roll stability for ease of onboarding (e.g., for a novice rider) and low-speed operation. Upon reaching moderate speed range during operation, the rider may flip the control lever to the "low-preload" position in order to rapidly transition the snail cam to the low-preload position, reduce compression of the spring element 180, and thus reduce roll stability and increase responsiveness of the scooter during cornering and carving motions. Upon increasing or reducing her speed and moving outside of this moderate speed range, the rider may flip the control lever back to the default "high-preload" position in order to rapidly transition the snail cam back to the high-preload position, increase compression of the spring element 180, and thus increase high-speed and low-speed roll stability of the scooter.

7.3 Eccentric Retainer with Ratchet Control

Yet alternatively, the truck 100 can include a manually-actuated foot pedal or foot switch located on the deck 212, such as near the rear of the deck 212 for operation by the rider's back foot while riding the scooter. In this implementation, the foot pedal can be coupled to a ratchet, and the ratchet can be coupled to the snail cam directly or via push-pull cables, etc.

In this implementation, the ratchet can also include a bi-modal ratchet pawl coupled to a second foot switch or controlled directly by motion of the foot pedal in a secondary direction. Thus, when the rider actuates the foot pedal with the second foot switch—and therefore the bi-modal ratchet pawl—in a first position, the foot pedal can drive the ratchet in a first direction, which rotates the snail cam in a first direction, drives the thrust washer up the eccentric cam face, and increases preload of the spring element 180. However, when the rider actuates the foot pedal with the second foot switch—and thus the bi-modal ratchet pawl—in the second position, the foot pedal can drive the ratchet in a second direction, which rotates the snail cam in a second direction, releases the thrust washer down the eccentric cam face, and decreases preload of the spring element 180.

7.4 Electromechanical Control

In another implementation, the truck 100 includes a motor geared to the snail cam—such as via a worm drive—and configured to drive the snail cam between a low-preload position and a high-preload position responsive to commands from manually-operated switches on the scooter (e.g., mounted to handlebars 226 of the scooter) or from an autonomous stability control module 170 within the scooter.

In a similar implementation, the truck 100 includes a motor coupled to the nut, such as via a gearbox and/or a timing belt. For example, the nut can be threaded onto the threaded section of the lower longitudinal shaft 161, can include outer gear teeth, and can define a sun gear in a planetary gearbox. The motor can be mounted to the cam block 110, can be coupled to a ring gear of the planetary gearbox, and thus tighten and loosen the nut on the lower longitudinal shaft 161.

The motor can thus rotate the nut directly on the threaded section of the lower longitudinal shaft 161 in order to tighten and loosen the nut against the spring element 180, such as: responsive to manual input at a button or other control interface mounted on the handlebars 226 of the scooter; or responsive to a control output of the stability control module 170. For example, in this implementation, the stability control module 170 can: monitor the speed of the scooter based on a wheel speed of the front wheel assembly 202 of the scooter; actuate the motor in a first direction to tighten the nut against the spring element 180 and increase preload on the spring element 180 in order to increase roll stability of the scooter at both low and high scooter speeds (e.g., below 3 miles per hour above 20 miles per hour or a tspeeds predefined by the rider); and actuate the motor in a second direction to loosen the nut from the spring element 180 and decrease preload on the spring element 180 in order to increase mobility of the scooter at moderate speeds (e.g., between 3 miles per hour and 20 miles per hour or within a speed range predefined by the rider).

Therefore, in this implementation, the truck 100 can include: a remote controller (e.g., arranged on a handlebar 226 of the scooter); and an electromechanical actuator 172 configured to rotate the retainer 163 (e.g., the nut) on the retention section 162 (e.g., the threaded end) of the lower longitudinal shaft 161 to modify preload on the spring element 180 responsive to receipt of a command from the remote controller. Accordingly, the truck 100 can include a speed sensor configured to detect a speed of the scooter. The truck 100 can also include (or be coupled to) a controller actuator 172 configured to automatically: retract the retainer 163 on the retention section 162 of the lower longitudinal shaft 161 to decrease preload on the spring element 180 responsive to the speed of the scooter falling within a moderate speed range; advance the retainer 163 on the retention section 162 of the lower longitudinal shaft 161 to increase preload on the spring element 180 responsive to the speed of the scooter dropping below the moderate speed range; and advance the retainer 163 on the retention section 162 of the lower longitudinal shaft 161 to increase preload on the spring element 180 responsive to the speed of the scooter exceeding the moderate speed range.

7.5 Adjustable Nut with Manual Control

In another implementation, the nut is threaded onto the threaded section of the lower longitudinal shaft 161, includes outer gear teeth, and defines a pinion gear. The truck 100 also includes a cable: defining a first end coupled to a control knob at a handlebar 226 on the scooter; running in a flexible torque tube from the control knob to the truck 100; defining a second end coupled to a worm gear meshed with the nut; and configured to transmit a torque—input by the rider—from the control knob to the worm gear to rotate the nut and selectively adjust preload of the spring element 180.

However, the retainer 163 can define or cooperate with any other feature or mechanism in the truck 100 or the scooter 200 to adjust preload of the spring element 180 and thus control stability of the scooter 200 when stopped and over a range of speeds.

8. Quick-Release Wheel Assembly

Figure 7:
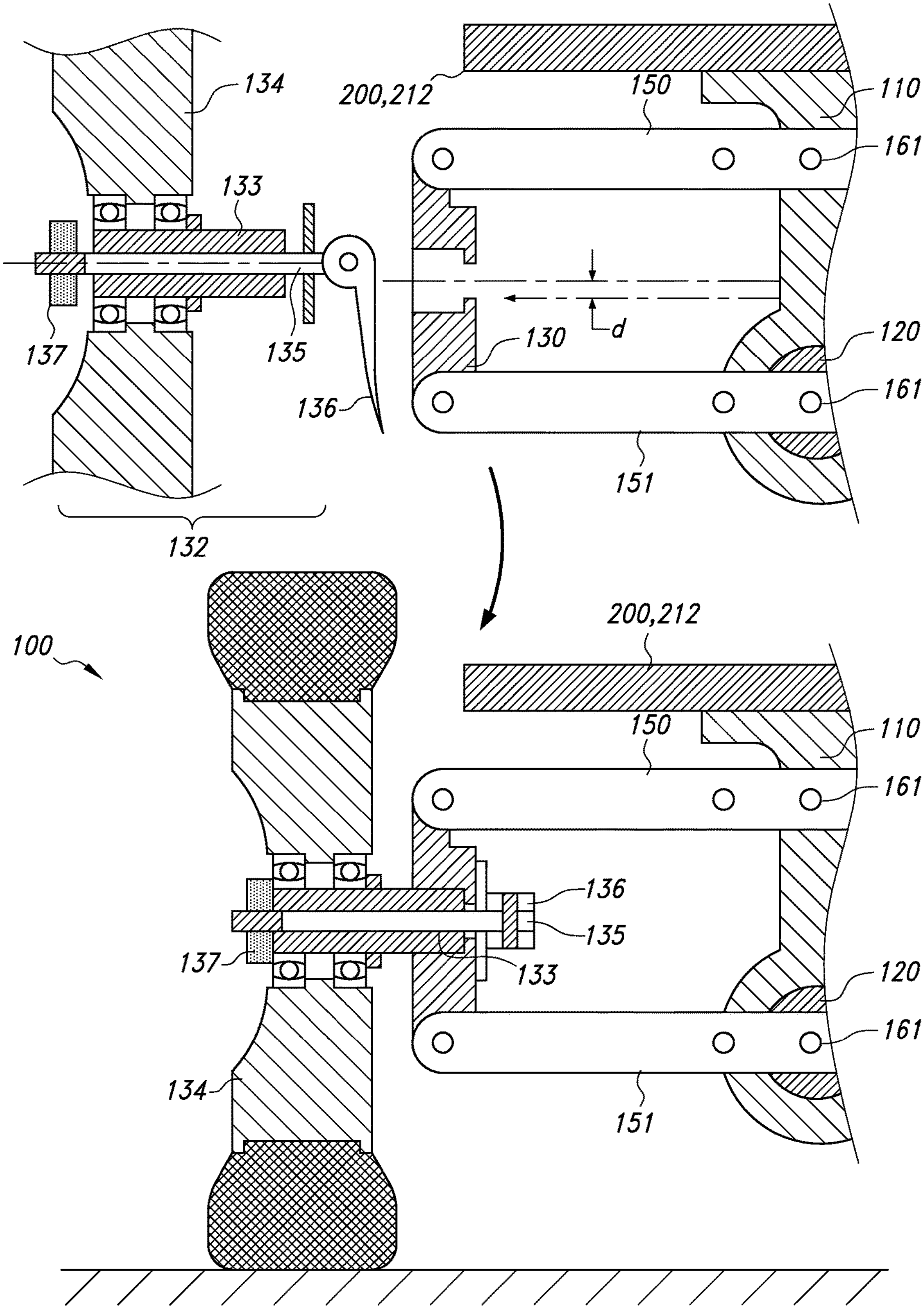
FIG. 7 is a flowchart representation of one variation of the truck.

In one variation shown in FIG. 7, the left and right wheel uprights 140, 130 cooperate to accept and locate quick-release wheel assemblies, such as to enable a rider or technician to: quickly replace worn wheel assembly components with new components; and quickly exchange different wheel assembly components, such as wheels of different sizes, hardnesses, colors, or tread patterns, etc.

8.1 Quick-Release Wheel Assembly with Fixed Axle

In one implementation, the right wheel axle 133 defines a hollow axle extending from and mounted to the right wheel upright 130. In this implementation, the right wheel assembly 132 includes: a right wheel 134; a right tire mounted to the right wheel 134; a skewer 135 configured to run through the hollow section of the right wheel axle 133; and a quick-release cam lever 136 coupled to the skewer 135 and configured to selectively tension the skewer 135 to retain the right wheel 134 on the right wheel axle 133.

For example, in this implementation, the right wheel axle 133 can be rigidly mounted to the right wheel upright 130, and the right wheel assembly 132 can include: an axle nut 137 threaded onto the skewer 135 opposite the quick-release cam lever 136; and a thrust washer, thrust bearing, or tapered bearing between the quick-release cam lever 136 and the outer face of the right wheel 134. Thus, to install the right wheel assembly 132 on the right wheel upright 130, the rider or a technician may: remove the axle nut 137 from a first end of the skewer 135; insert the first end of the skewer 135 into and through the hollow axle; seat a set of bearings within the right wheel 134 over the right hollow axle; reinstall and adjust the axle nut 137 on the first end of the skewer 135; and then close the quick-release cam lever 136 to tension the skewer 135 and retain the right wheel 134 on the right hollow axle between the thrust washer or thrust bearing and the right wheel upright 130. Then, to remove the right wheel assembly 132 from the right wheel upright 130, the rider or a technician may: open the quick-release cam lever 136 to release tension on the skewer 135; remove the axle nut 137 from the first end of the skewer 135; and withdraw the right wheel assembly 132 out of the right hollow axle.

Alternatively, in this implementation, the quick-release cam lever 136 and the axle nut 137 can be reversed such that the quick-release cam lever 136 is arranged between the right wheel upright 130 and the pivot block 120, shielded by the truck 100, and therefore less accessible to damage or inadvertent release than a quick-release cam lever 136 arranged on the outside of the right wheel 134.

The left wheel upright 140 and the left wheel assembly 142 can be similarly configured.

8.2 Quick-Release Wheel Assembly with Removable Axle

In another implementation shown in FIG. 7, the right wheel upright 130 defines an axle slot configured to transiently receive a hollow axle. In this implementation, the right wheel assembly 132 includes: a right hollow axle configured to transiently install in the axle slot in the right wheel upright 130; a right wheel 134 mounted to the right hollow axle via a set of bearings; a right tire mounted to the right wheel 134; a skewer 135 configured to run through the right hollow axle; an axle nut 137 arranged on the skewer 135 and configured to seat on an outer thrust surface of the right wheel 134; and a quick-release cam lever 136 coupled to the skewer 135 opposite the axle nut 137 and configured to selectively tension the skewer 135 to retain the right wheel 134 on the right wheel axle 133.

Furthermore, the quick-release cam lever 136 can be configured to: seat on an inner face of the right wheel upright 130 opposite the right wheel 134; and tension the skewer 135 to retain the right wheel axle 133 within the axle slot and to maintain the right wheel axle 133 and the right wheel 134 between the axle nut 137 and the right wheel upright 130.

For example, in this implementation, the right wheel 134, the right tire, the skewer 135, quick-release cam lever 136, the quick-release cam lever 136, the hollow axle, and the axle nut 137 can cooperate to form a right wheel assembly 132 separable from the right wheel upright 130 following release of the quick-release cam lever 136. Thus, to install the right wheel assembly 132 on the right wheel upright 130, the rider or a technician may: open the quick-release cam lever 136; insert a section of the right hollow axle—extending inwardly from the right wheel 134—into the axle slot in the right wheel upright 130; and then close the quick-release cam lever 136 such that the quick-release cam lever 136 extends rearward from the truck 100 and between the right wheel upright 130 and the pivot block 120. Similarly, to remove the right wheel assembly 132 from the right wheel upright 130, the rider or a technician may: open the quick-release cam lever 136 (e.g., by rotating the quick-release cam lever 136 toward the pivot block 120); and slide the right hollow axle out of the axle slot in the right wheel upright 130.

The left wheel upright 140 and the left wheel assembly 142 can be similarly configured.

9. Fenders

As described above and shown in FIGS. 1B and 2B, the left and right wheel uprights 140, 130 can further include fender mounts configured to locate fenders 190 over the left and right wheels 144, 134, which may block road spray (e.g., water, mud, road debris) moving off of the wheels from reaching the rider. Because these fenders 190 are mounted to the wheel uprights (e.g., rather than to the deck 212 of the scooter), these fenders 190 may: define small structures located in (very) close proximity to adjacent wheels without sacrificing effective road spray blocking or rubbing against these wheels; track with these wheels as the wheels and wheel uprights lean during turns; and remain unobtrusive to operation of the scooter.

8.1 Folding Hard Fenders+Folder Scooter

In this variation, a fender 190 can include both: a fixed fender 190 section (e.g., a trailing section) configured to rigidly mount to a wheel upright; and an operable fender 190 section (e.g., a leading section). The operable fender 190 section: can be sprung off of the adjacent wheel upright and/or off of the adjacent fixed fender 190 section; and can include a braking surface 192 configured to contact and brake an adjacent wheel, such as when manually depressed by a rider's foot.

In one implementation shown in FIGS. 12A, 12B, and 12C, the deck 212 defines a "split deck 212" that folds (or "collapses") about a deck hinge 214 to transition from a "go mode" into a "tow" or "stow" mode, as described in U.S. patent application Ser. No. 16/535,004. In this implementation, the deck 212 includes: a front deck section 210; a rear deck section 213 supporting the rear truck 100 opposite the front deck section 210; a deck hinge 214 interposed between the front deck section 210 and the rear deck section 213, operable in an open deck position that locates the front deck section 210 tangent to the rear deck section 213 to form a substantially continuous deck surface, and operable in a closed deck position to separate the front deck section 210 from the rear deck section 213 and raise the deck hinge 214 above the rear truck 100; and a deck latch configured to selectively lock the deck hinge 214 in the closed deck position. Between operations, the rider may release the deck hinge 214 in order to collapse the front and rear deck sections 210, 213, thereby transitioning the scooter from the "go" mode into the "tow" mode (e.g., for one-handed lugging analogous to wheeled luggage) or into the "stow" mode (e.g., for storage under a desk or in a luggage compartment), as shown in FIG. 13.

Figure 14:
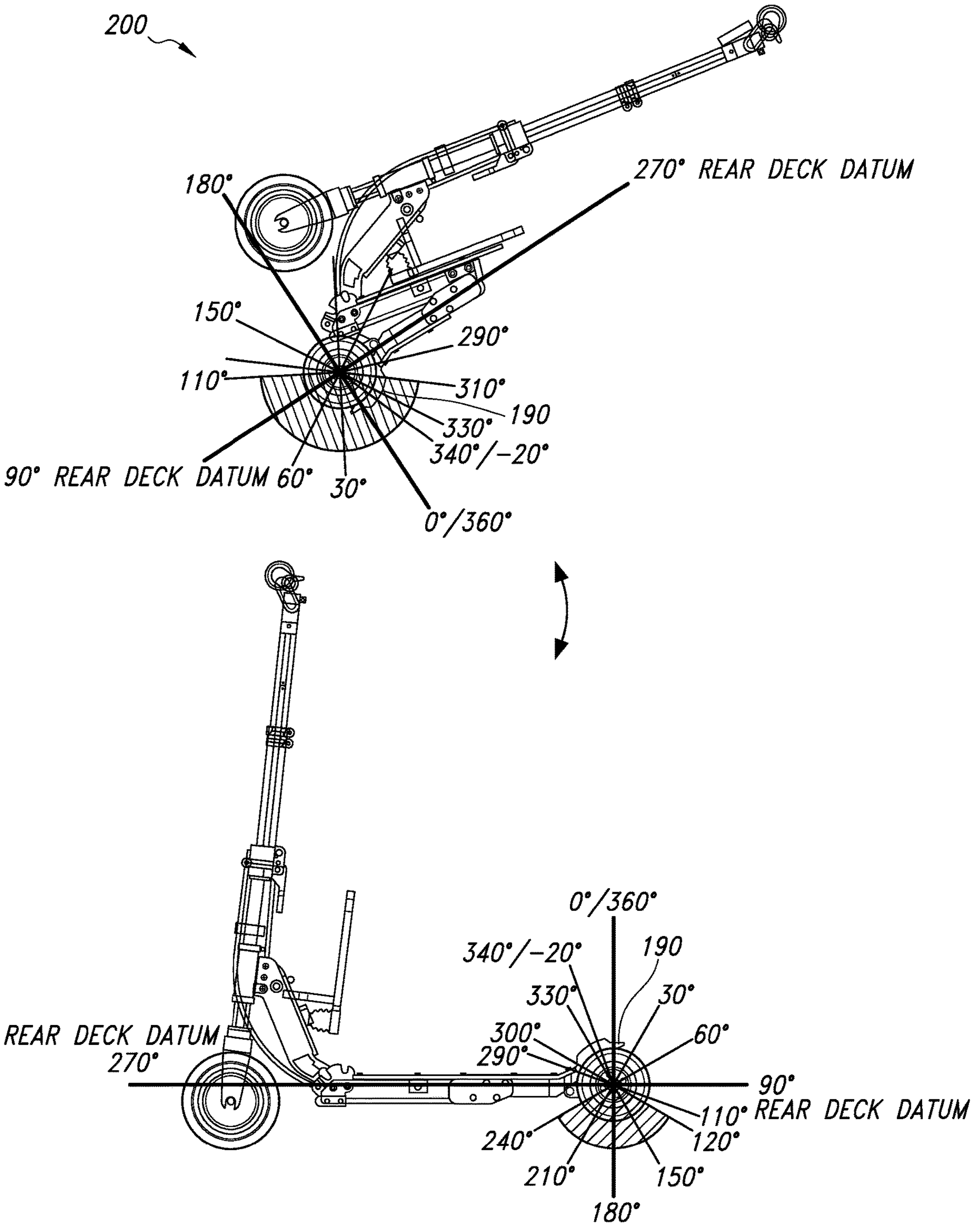
FIG. 14 is a flowchart representation of one variation of the personal mobility vehicle.

Thus, to avoid collision with ground discontinuities and to enable the rear wheel assemblies on the truck 100 to traverse pavement unobstructed in the "go" mode, these fenders 190 may span a radial section of the wheel excluding a radial section from a 120° position to a 240° position about the wheel, as shown in FIGS. 12B and 14. To avoid collision with the ground and to enable the scooter to remain upright on three wheels in the "tow" mode, these fenders 190 may also span a radial section of the wheel excluding a radial section from a 60° position to a 110° position about the wheel. Furthermore, to avoid collision with ground discontinuities and to enable the rear wheel assemblies on the truck 100 to traverse pavement unobstructed in the "tow" mode with the scooter tugged behind the rider, these fenders 190 may span a radial section of the wheel excluding a radial section from a −20° position to a 110° position about the wheel.

Therefore, in this variation, a front fender section 191 of a fender 190 can span a radial section from a 240° position to a 310° position about the adjacent wheel when mounted to a fender mount extending from a wheel upright, as shown in FIG. 14. The rear fender section 193 can be pivotably coupled to the fender mount after of the front fender section 191 and can span a radial section from the 310° position to the 120° position about the wheel in a "go" position. The front fender section 191 can also be spring-loaded on the fender mount such that the front fender section 191: pivots downward on the fender mount to brake against the adjacent wheel when depressed by the rider; and returns to the "go" position when released by the rider.

However, the rear fender section 193 can also pivot forward approximately 180° on the fender mount in a "retracted" position to eliminate obstruction of the adjacent wheel from the 310° position to the 240° position of the wheel in the "tow" and "stow" modes. For example, the fender 190 can include a bistable spring that locates the rear fender section 193 in either the "go" position or the "retracted" position. In this example, when the scooter is transitioned from the "go" mode to the "tow" or "stow" mode, the rear truck 100 pitches rearward, causing the rear fender sections 193 on the left and right fenders 190 to contact the adjacent ground surface and to tension their corresponding springs. At a threshold position of the rear deck section 213 between the "go" mode and the "tow" or "stow" mode, the springs invert and thus retract the rear fender sections 193 into their "retracted" positions. Conversely, when the scooter is transitioned from the "tow" or "stow" mode back into the "go" mode, the rider can tap the rear fender sections 193 rearward with her hand or foot to return the rear fender sections 193 to their "go" positions.

In a similar implementation, a wheel upright includes a fender mount extending upwardly from its wheel axle. In this implementation, a fender 190 includes: a leading brake-fender 190 section pivotably coupled to a fender mount; a brake pad mounted (e.g., fastened, bonded) to the underside of the leading brake-fender 190 section; a brake spring interposed between the leading brake-fender 190 section and the fender mount and configured to lift the leading brake-fender 190 section off of the adjacent tire; and a rear fender section 193 mounted to the fender mount. In this implementation, the rear fender section 193 can be pivotably coupled to the fender mount and can be operable between a down position (e.g., in the "go" mode) and a retracted position (e.g., in the "tow" and "stow" modes). For example, the leading brake-fender 190 section and the rear fender section 193 can be pivotably coupled to the fender mount via a common pivot bolt, and a second bistable spring can selectively retain the rear fender section 193 in the down and retracted positions.

8.1.1 Example

Figure 8:
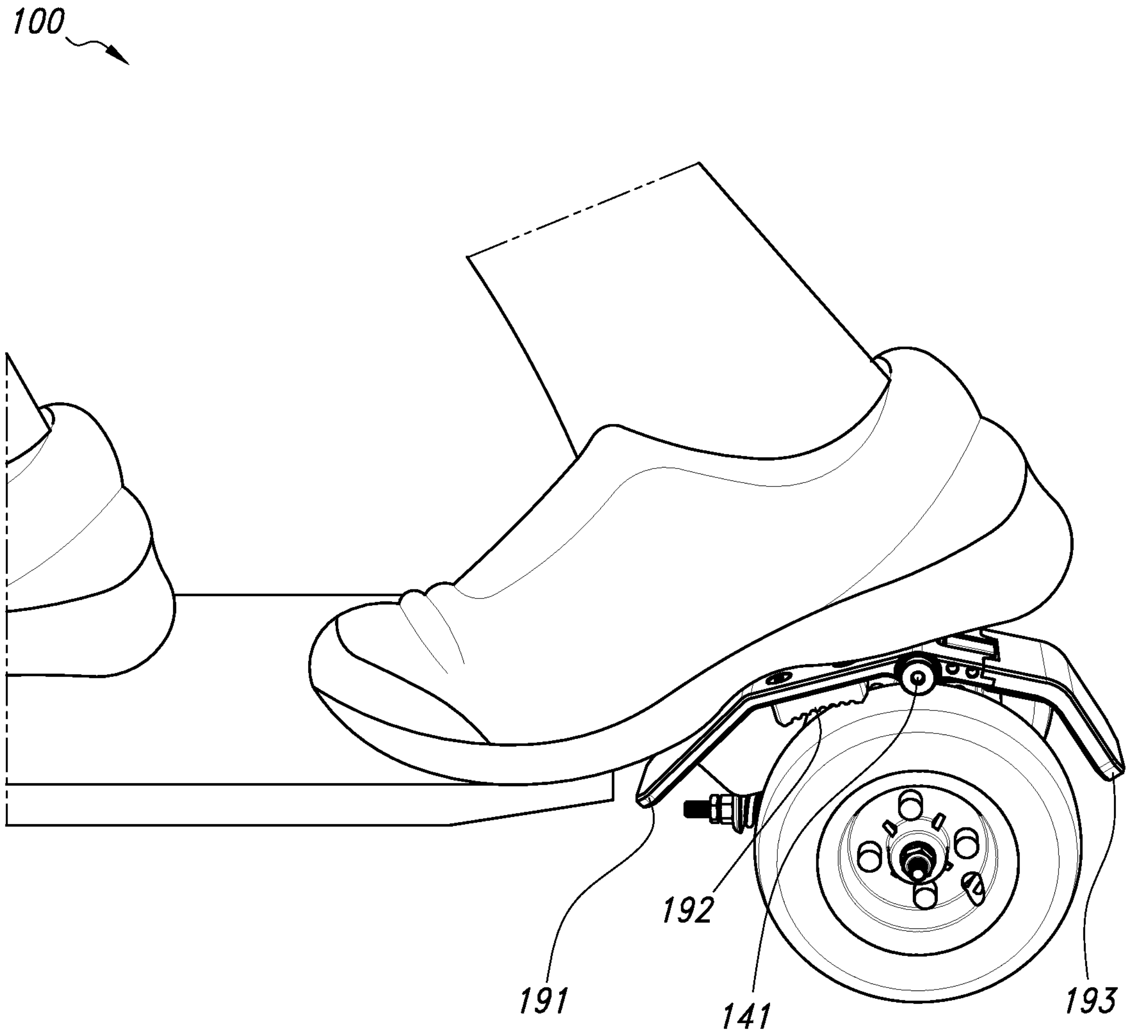
FIG. 8 is a schematic representation of one variation of the truck.

For example, in this implementation, the right wheel upright 130 can define a right fender mount 131 extending above the right wheel axle 133. The truck 100 can include: a right front fender section 191 pivotably coupled to the mount, extending forward from the mount, and defining a braking surface 192 configured to selectively engage and brake a surface of the right wheel assembly 132, as shown in FIG. 8; and a right rear fender section 193 coupled to mount and extending rearward from the mount. The scooter can include: a front deck section 210 defining a front deck surface; a rear deck section 213 defining a rear deck surface, cooperating with the front deck section 210 to define the deck 212, and supported by the right wheel assembly 132 and the left wheel assembly 142 via the cam block 110; a deck hinge 214 interposed between the front deck section 210 and the rear deck section 213; a front wheel assembly 202 supported on the front deck section 210; and a deck control 215 configured to release the deck hinge 214 for transition of the deck 212 between an open deck position and a closed deck position.

For example and as shown in FIGS. 12A and 13, the deck hinge 214 can occupy the open deck position in a "go" mode of the scooter, wherein the scooter is configured for riding on the first wheel assembly, the right wheel assembly 132, and the left wheel assembly 142 by a rider in the "go" mode. In this example, the right rear fender section 193 can occupy a lowered position in the go mode of the scooter to shield the rider from road spray from the right wheel assembly 132. Conversely as shown in FIGS. 12B and 13, the deck hinge 214 can occupy the closed deck position in a tow mode of the scooter, wherein the scooter is configured for manual towing on the right wheel assembly 132 and the left wheel assembly 142 in the tow mode. Furthermore, the right rear fender section 193 can occupy a retracted position in the tow mode of the scooter to avoid contact with a ground surface during towing of the scooter on the right wheel assembly 132 and the left wheel assembly 142. In particular, the right rear fender section 193 can be manually rotated from the lowered position to the retracted position (e.g., pivoted about the right fender mount 131 away from the right wheel 134) when the scooter is transitioned from the go mode into the tow mode.

Furthermore, in this example, the scooter can include: a neck hinge 220 coupled to the front deck section 210 opposite the deck hinge 214; a neck 222 coupled to the neck hinge 220 opposite the front deck section 210; a stem 224 rotatably coupled to the neck 222 and supported by the front wheel assembly 202; a set of handlebars 226 coupled the stem 224 opposite the front wheel assembly 202; and a neck control 228 configured to release the neck hinge 220 for transition between an open neck 222 position and a closed neck 222 position. Accordingly, the neck hinge 220 can occupy the open neck 222 position in the go mode of the scooter to enable the scooter to be ridden and steering by the rider; and the he neck hinge 220 can occupy the closed neck 222 position in the tow mode for manual towing by the rider.

The left wheel upright 140 can similarly include a left fender mount 141 configured to locate a fender 190 over the left wheel assembly 142.

8.2 Soft Fenders

In another implementation, the fender 190 includes a soft polymer half-"cupped" structure: configured to mount to a wheel upright (e.g., near a 270° position on the adjacent wheel); operable in a concave position to cover a radial segment of the adjacent wheel (e.g., from a 120° position to a 240° position about the wheel); and operable in a convex position in which the fender 190 is folded inside-out to render a large radial portion of the adjacent wheel unobstructed (e.g., from the 240° position to a 330° position about the wheel). For example, in this implementation, a fender 190 can include an elastic silicone "cup" structure configured to invert between the concave and convex position to cover and uncover the adjacent wheel.

8.2.1 Soft Fenders

For example, in this implementation, the right fender 190: can include an elastic material (e.g., silicone); can approximate a hemi-ellipsoidal geometry; can be mounted to the right wheel upright 130 via the right fender mount 131; and can be operable (e.g., bistable) in a first configuration and an inverted configuration. In particular, the right fender 190:

can extend over a portion of the right wheel assembly 132 in the first configuration; and can be manually turned inside out to retract over the right wheel assembly 132 in the inverted configuration.

In this example and as described above, the scooter can include: a front deck section 210 defining a front deck surface; a rear deck section 213 defining a rear deck surface, cooperating with the front deck section 210 to define the deck 212, and supported by the right wheel assembly 132 and the left wheel assembly 142 via the cam block 110; a deck hinge 214 interposed between the front deck section 210 and the rear deck section 213; a front wheel assembly 202 supported on the front deck section 210; and a deck control 215 configured to release the deck hinge 214 for transition of the deck 212 between an open deck position and a closed deck position. Thus, in this example, the deck hinge 214 can occupy the open deck position in a go mode of the personal mobility vehicle 200, wherein the personal mobility vehicle 200 is configured for riding on the first wheel assembly, the right wheel assembly 132, and the left wheel assembly 142 by a rider in the first mode. Furthermore, the right fender 190 can occupy the first configuration in the first mode of the personal mobility vehicle 200 to shield the rider from road spray from the right wheel assembly 132. Conversely, the deck hinge 214 can occupy the closed deck position in a tow mode of the personal mobility vehicle 200, wherein the personal mobility vehicle 200 is configured for manual towing on the right wheel assembly 132 and the left wheel assembly 142 in the second mode. Furthermore, the right fender 190 can occupy the inverted configuration in the tow mode of the personal mobility vehicle 200 to avoid contact with a ground surface during towing of the personal mobility vehicle 200 on the right wheel assembly 132 and the left wheel assembly 142.

8.3 Extensible Fenders

Figure 9:
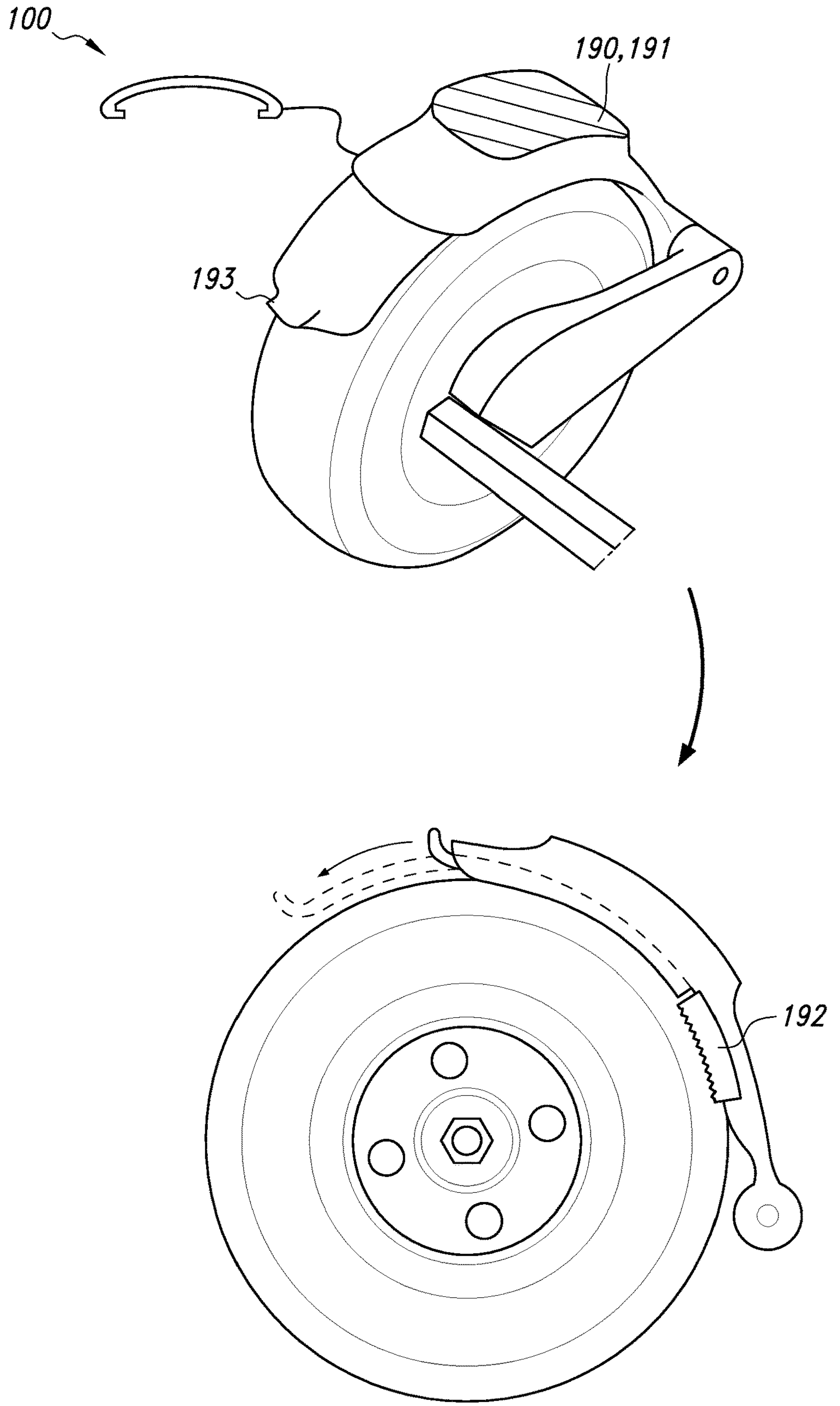
FIG. 9 is a flowchart representation of one variation of the truck.

In another implementation shown in FIGS. 8 and 9, the fender 190 includes: a front fender section 191 pivotably coupled to a front of an adjacent wheel upright and defining a braking surface 192; and a rear fender section 193 that slides (or "telescopes") into and out of the front fender section 191. In this implementation, the rear fender section 193: can be extended rearward out of the front fender section 191 to cover the rear of the adjacent wheel in the "go" mode; and can be retracted forward into the front fender section 191 to increase clearance around the adjacent wheel in the "tow" and "stow" modes.

8.4 Rotating Fenders

Figure 10:
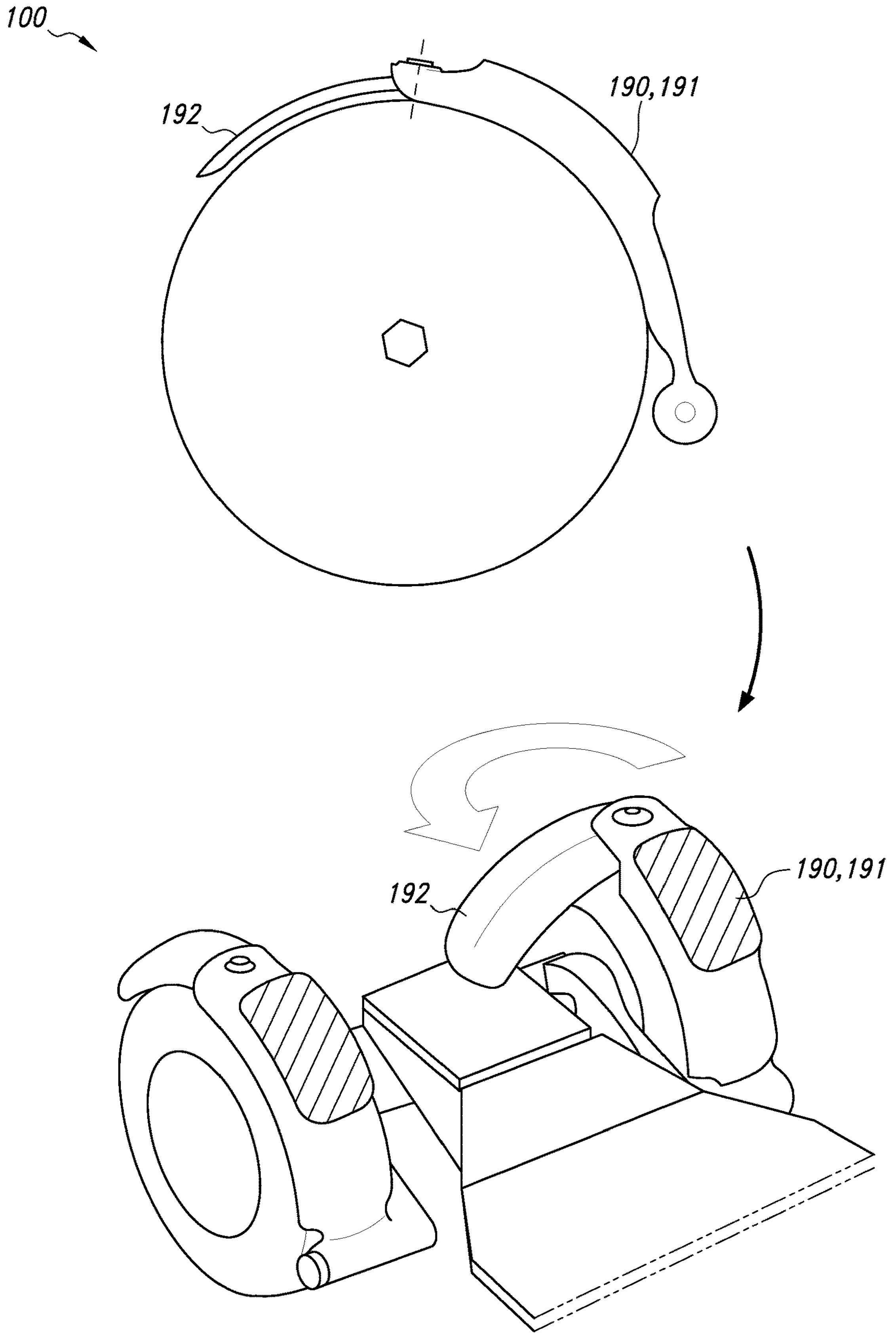
FIG. 10 is a flowchart representation of one variation of the truck.

In a similar implementation shown in FIG. 10, the fender 190 includes: a front fender section 191 pivotably coupled to a front of an adjacent wheel upright and defining a braking surface 192; and a rear fender section 193 coupled to the front fender section 191 about a vertically-oriented pivot. In this implementation, the rear fender section 193: can be rotated rearward from the front fender section 191 to cover the rear of the adjacent wheel in the "go" mode; and can be rotated forward to increase clearance around the adjacent wheel in the "tow" and "stow" modes.

8.5 Quick-Change Fender

Figure 11:
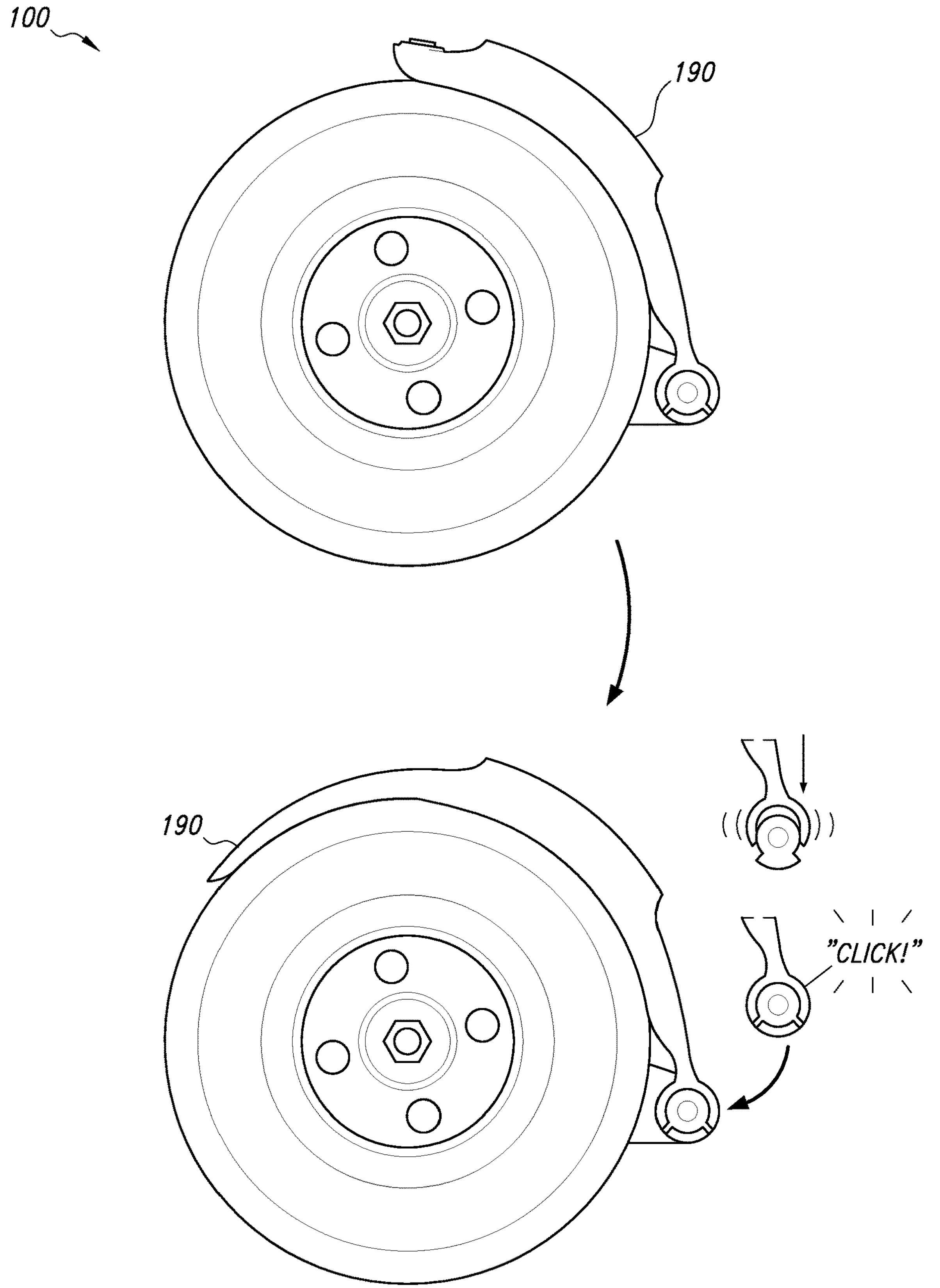
FIG. 11 is a flowchart representation of one variation of the truck.

In the foregoing implementations, the fender 190 can be configured to clamp onto a pivot extending from the adjacent wheel upright, as shown in FIG. 11. In this variation, the truck 100 can also include a kit of fenders 190 of different lengths, and these fenders 190 can be selectively installed and removed from the truck 100 by a rider as the rider transitions the scooter between modes.

As a person skilled in the art will recognize from the previous detailed description and from the figures and claims, modifications and changes can be made to the embodiments of the invention without departing from the scope of this invention as defined in the following claims.

We claim:

1. A system comprising:
- a mounting block:
  - configured to mount to a deck configured to support a user; and
  - defining:
    - a first pivot feature;
    - a second pivot feature vertically offset from the first pivot feature; and
    - a cam surface;
- a right wheel upright;
- a left wheel upright;
- a first lateral link pivotably coupled to the first pivot feature;
- a second lateral link:
  - coupled to the mounting block;
  - cooperating with the right wheel upright, the left wheel upright, and the first lateral link to form a four-bar linkage; and
  - comprising a cam follower; and
- a compression element:
  - configured to drive the cam follower of the second lateral link against the cam surface of the mounting block to bias the second lateral link toward a neutral position, the deck parallel to a ground surface when the second lateral link occupies the neutral position; and
  - configured to compress during traversal of the cam follower along the cam surface to:
    - enable the deck to rotate relative to the ground surface; and
    - increase a restoring moment applied by the cam surface to the cam follower to return the second lateral link to the neutral position.

2. The system of claim 1, wherein the mounting block and the second lateral link cooperate to:
- transmit torques, applied to the deck by the user, through the cam surface and the cam follower, into the four-bar linkage, and into a right wheel and a left wheel mounted to the right wheel upright and the left wheel upright; and
- drive the cam follower against the cam surface to compress the compression element.

3. The system of claim 1:
- wherein the mounting block is configured to rotate the cam surface relative to the cam follower responsive to angular displacement of the deck relative to the ground surface;
- wherein the cam follower is configured to ride up the cam surface to compress the compression element proportional to a lean angle of the deck relative to the ground surface.

4. The system of claim 1:
- wherein the mounting block is configured to mount to a rear of the deck opposite a front wheel and a steering column, the deck, the front wheel, and the steering column cooperating to form a scooter; and wherein the compression element is configured to compress during traversal of the cam follower along the cam surface to:

increase the restoring moment applied by the cam surface to the cam follower, to return the second lateral link to the neutral position, independently of a steering angle of the front wheel.

5. The system of claim 1, wherein the compression element is configured to drive the cam follower against the cam surface to maintain the second lateral link in the neutral position, with the deck parallel to the ground surface, when the deck is unoccupied by the user.

6. The system of claim 1:

further comprising:

the deck;

a neck hinge:

coupled to the deck opposite the mounting block; and operable in an open neck position and a closed neck position;

a neck coupled to the neck hinge opposite the deck;

a steering column extending through the neck; and a front wheel coupled to the steering column;

wherein the deck, the neck hinge, the neck, the steering column, and the front wheel cooperate to form a scooter operable in:

a ride mode with the neck hinge in the open position; and a tow mode with the neck hinge in the closed position; and wherein the compression element is configured to:

drive the cam follower against the cam surface to maintain the second lateral link in the neutral position, with the deck parallel to the ground surface, when the deck is unoccupied by the user in the tow mode; and compress during traversal of the cam follower along the cam surface to enable rotation of the deck out of the neutral position and to increase the restoring moment applied by the cam surface to the cam follower to return the second lateral link to the neutral position in the ride mode.

7. The system of claim 1:

wherein the first lateral link is configured to rotate about the first pivot feature to remain parallel to the the second lateral link over a range of lean angles of the deck;

further comprising:

a right wheel coupled to the right wheel upright; and a left wheel coupled to the left wheel upright;

wherein the first lateral link, the second lateral link, the right wheel upright, and the left wheel upright cooperate to maintain the right wheel parallel to the left wheel; and maintain the right wheel and the left wheel in contact with the ground surface over the range of lean angles of the deck.

8. The system of claim 1:

wherein the cam surface of the mounting block defines a first set of lobes arranged about the second pivot feature;

wherein the second lateral link comprises a beam extending laterally between and pivotably coupled to the right wheel upright and the left wheel upright;

further comprising a pivot shaft:

extending longitudinally from the beam; and pivotably coupling the second lateral link to the second pivot feature of the mounting block; and wherein the cam follower defines a second set of lobes configured to ride over the first set of lobes when the second lateral link pivots about the second pivot feature.

9. The system of claim 1:

wherein the right wheel upright comprises a hollow axle; and further comprising:

a right wheel; and a quick-release skewer configured to run through the right wheel and the hollow axle; and transiently retain the right wheel on the hollow axle of the right wheel upright.

10. The system of claim 1, wherein the right wheel upright comprises:

a right hub comprising:

an upper pivot pivotably coupled to the first lateral link; and a lower junction pivotably coupled to the second lateral link; and a right axle:

extending outwardly from the right hub; and arranged between the upper pivot and the lower junction to locate a roll center of the system below the right axle.

11. The system of claim 1:

wherein the cam surface is arranged radially about and is coaxial with the second pivot feature;

wherein the second pivot feature of the mounting block comprises a second pivot bore;

further comprising a pivot shaft:

coupled to the second lateral link; and extending through the second pivot bore; and wherein the cam follower is arranged radially about and is coaxial with the second pivot shaft.

12. The system of claim 11, wherein the mounting block:

defines a set of receptacles arranged radially above the second pivot bore; and comprises a set of ball bearings:

located in the set of receptacles; and defining the cam surface.

13. The system of claim 11:

wherein the pivot shaft extends through the mounting block; and wherein the compression element comprises a spring:

arranged between:

the mounting block; and a proximal end of the pivot shaft opposite the second lateral link; and configured to draw the pivot shaft through the second pivot bore to drive the cam follower against the cam surface.

14. The system of claim 1, further comprising a retainer operable over a range of positions to:

adjust compression preload of the compression element; and adjust a rate of the restoring moment, applied by the cam surface to the cam follower, relative to lean angle of the deck relative to the ground surface.

15. The system of claim 1, wherein the compression element is configured to set a thrust preload applied by the cam follower to the cam surface in the neutral position to control a torque threshold, applied to the deck by the user, to rotate the deck out of the neutral position.

16. The system of claim 1:
wherein the right wheel upright comprises:
a right axle; and
a right fender mount; and
further comprising
a right wheel mounted to the right axle of the right wheel upright; and
a right fender:
coupled to the right fender mount; and
extended over a portion of the right wheel.

17. A system comprising:
a mounting block:
configured to mount to a deck configured to support a user; and
defining:
a first pivot feature;
a second pivot feature vertically offset from the first pivot feature; and
a right wheel upright;
a left wheel upright;
a first lateral link pivotably coupled to the first pivot feature;
a second lateral link:
coupled to the pivot block;
cooperating with the right wheel upright, the left wheel upright, and the first lateral link to form a four-bar linkage; and
a spring element:
configured to bias the second lateral link toward a neutral position, the deck parallel to a ground surface when the second lateral link occupies the neutral position; and
configured to yield during rotation of the second lateral link relative the mounting block to:
enable the deck to rotate relative to the ground surface; and
apply a restoring moment to the second lateral link to return the second lateral link to the neutral position.

18. The system of claim 17:
wherein the mounting block defines a cam surface;
further comprising a cam block:
coupling the second lateral link to the second pivot feature of the mounting block; and
defining a cam follower; and
wherein the spring element is configured to drive the cam follower against the cam surface to bias the second lateral link toward the neutral position.

19. A system comprising:
a mounting block:
configured to mount to a deck configured to support a user; and
comprising:
a first pivot; and
a second pivot vertically offset from the first pivot;
a right wheel upright;
a left wheel upright;
a first lateral link pivotably coupled to the mounting block via the first pivot;
a second lateral link:
pivotably coupled to the mounting block via the second pivot; and
cooperating with the right wheel upright, the left wheel upright, and the first lateral link to form a four-bar linkage; and
a spring element:
configured to bias the second lateral link toward a neutral position, the deck parallel to a ground surface when the second lateral link occupies the neutral position; and
configured to yield to torque applied between the second lateral link and the mounting block to enable the deck to rotate relative to the ground surface when the deck is occupied by the user.

20. The system of claim 19:
further comprising:
the deck;
a neck hinge:
coupled to the deck opposite the mounting block; and
operable in an open neck position and a closed neck position;
a neck coupled to the neck hinge opposite the deck;
a steering column extending through the neck; and
a front wheel coupled to the steering column;
wherein the deck, the neck hinge, the neck, the steering column, and the front wheel cooperate to form a scooter operable in:
a ride mode with the neck hinge in the open position; and
a tow mode with the neck hinge in the closed position; and
wherein the compression element is configured to:
maintain the second lateral link in the neutral position, with the deck parallel to the ground surface, when the deck is unoccupied by the user in the tow mode; and
compress and increase a restoring moment applied between the mounting block and the second lateral link, to return the second lateral link to the neutral position, during rotation of the deck out of the neutral position in the ride mode.

* * * * *